(12) United States Patent
Dietle et al.

(10) Patent No.: US 9,121,503 B2
(45) Date of Patent: Sep. 1, 2015

(54) ROTARY SEAL WITH SUPPORTED INLET

(75) Inventors: Lannie Laroy Dietle, Houston, TX (US); Jeffrey D. Gobeli, Houston, TX (US)

(73) Assignee: Kalsi Engineering, Inc., Sugar Land, TX (US)

( * ) Notice: Subject to any disclaimer, the term of this patent is extended or adjusted under 35 U.S.C. 154(b) by 973 days.

(21) Appl. No.: 12/816,220

(22) Filed: Jun. 15, 2010

(65) Prior Publication Data

US 2011/0140365 A1 Jun. 16, 2011

Related U.S. Application Data

(60) Provisional application No. 61/268,698, filed on Jun. 15, 2009.

(51) Int. Cl.
*F16J 15/32* (2006.01)
*F16J 15/16* (2006.01)

(52) U.S. Cl.
CPC ............ *F16J 15/164* (2013.01); *F16J 15/3236* (2013.01); *F16J 15/3244* (2013.01)

(58) Field of Classification Search
USPC .................................................. 277/559, 567
See application file for complete search history.

(56) References Cited

U.S. PATENT DOCUMENTS

| 2,394,800 A | 2/1946 | Murphy |
| 2,764,428 A | 9/1946 | Murphy |
| 2,442,687 A | 6/1948 | Heathcott |
| 2,459,472 A | 1/1949 | Tremolada |
| 2,706,655 A | 4/1955 | Showalter |
| 3,271,039 A | 9/1966 | Kohl et al. |
| 3,572,730 A * | 3/1971 | Otto et al. ................. 277/400 |
| 3,913,460 A | 10/1975 | Wright |
| 3,929,340 A | 12/1975 | Peisker |
| 4,387,902 A | 6/1983 | Conover |
| 4,484,753 A | 11/1984 | Kalsi |
| 4,610,319 A | 9/1986 | Kalsi |
| 5,195,754 A | 3/1993 | Dietle |
| 5,230,520 A | 7/1993 | Dietle et al. |
| 5,263,404 A | 11/1993 | Gaucher et al. |
| 5,509,666 A * | 4/1996 | Abraham et al. ............ 277/562 |
| 5,678,829 A | 10/1997 | Kalsi et al. |
| 5,738,358 A * | 4/1998 | Kalsi et al. .................. 277/544 |
| 5,791,658 A * | 8/1998 | Johnston .................... 277/559 |
| 5,823,541 A | 10/1998 | Dietle et al. |

(Continued)

OTHER PUBLICATIONS

PCT/US2010/038728, Kalsi Engineering, Inc., The International Search Report and the Written Opinion of the International Searching Authority, dated Jun. 15, 2010.

*Primary Examiner* — Vishal Patel
*Assistant Examiner* — L. Susmitha Koneru
(74) *Attorney, Agent, or Firm* — Douglas W. Rommelmann; Andrews Kurth LLP

(57) ABSTRACT

A hydrodynamically lubricated sealing element for applications where the pressure of a contained fluid can be significantly greater than the pressure of the seal lubricant. The sealing element retains the pressure of the contained fluid and provides hydrodynamic lubricant pumping activity at the dynamic sealing interface to enhance service life. The invention is particularly suitable for oilfield drilling swivel washpipe assemblies, downhole drilling tools, and rotary mining equipment, and for applications such as artificial lift pump stuffing box assemblies and centrifugal pumps where a rotating shaft penetrates a pressurized reservoir that is filled with abrasive-laden liquids, mixtures, or slurries.

138 Claims, 10 Drawing Sheets

(56) References Cited

U.S. PATENT DOCUMENTS

| | | | |
|---|---|---|---|
| 5,873,576 A | 2/1999 | Dietle et al. | |
| 6,007,105 A | 12/1999 | Dietle et al. | |
| 6,036,192 A * | 3/2000 | Dietle et al. | 277/559 |
| 6,109,618 A | 8/2000 | Dietle | |
| 6,120,036 A * | 9/2000 | Kalsi et al. | 277/559 |
| 6,315,302 B1 * | 11/2001 | Conroy et al. | 277/559 |
| 6,334,619 B1 * | 1/2002 | Dietle et al. | 277/559 |
| 6,382,634 B1 | 5/2002 | Dietle et al. | |
| 6,494,462 B2 * | 12/2002 | Dietle | 277/549 |
| 6,561,520 B2 * | 5/2003 | Kalsi et al. | 277/559 |
| 6,685,194 B2 | 2/2004 | Dietle et al. | |
| 6,767,016 B2 * | 7/2004 | Gobeli et al. | 277/549 |
| 7,052,020 B2 * | 5/2006 | Gobeli et al. | 277/549 |
| 7,240,904 B2 * | 7/2007 | Droscher et al. | 277/349 |
| 7,562,878 B2 * | 7/2009 | Dietle et al. | 277/559 |
| 2001/0024016 A1 * | 9/2001 | Gobeli et al. | 277/400 |
| 2001/0045704 A1 * | 11/2001 | Kalsi et al. | 277/549 |
| 2002/0163138 A1 * | 11/2002 | Dietle | 277/559 |
| 2004/0104536 A1 * | 6/2004 | Gobeli et al. | 277/400 |
| 2006/0214379 A1 * | 9/2006 | James et al. | 277/404 |
| 2006/0214380 A1 * | 9/2006 | Dietle et al. | 277/559 |
| 2007/0013143 A1 * | 1/2007 | Schroeder et al. | 277/551 |
| 2007/0205563 A1 * | 9/2007 | Dietle et al. | 277/551 |
| 2007/0278749 A1 * | 12/2007 | Nakanishi et al. | 277/567 |
| 2009/0001671 A1 * | 1/2009 | Dietle et al. | 277/559 |

* cited by examiner

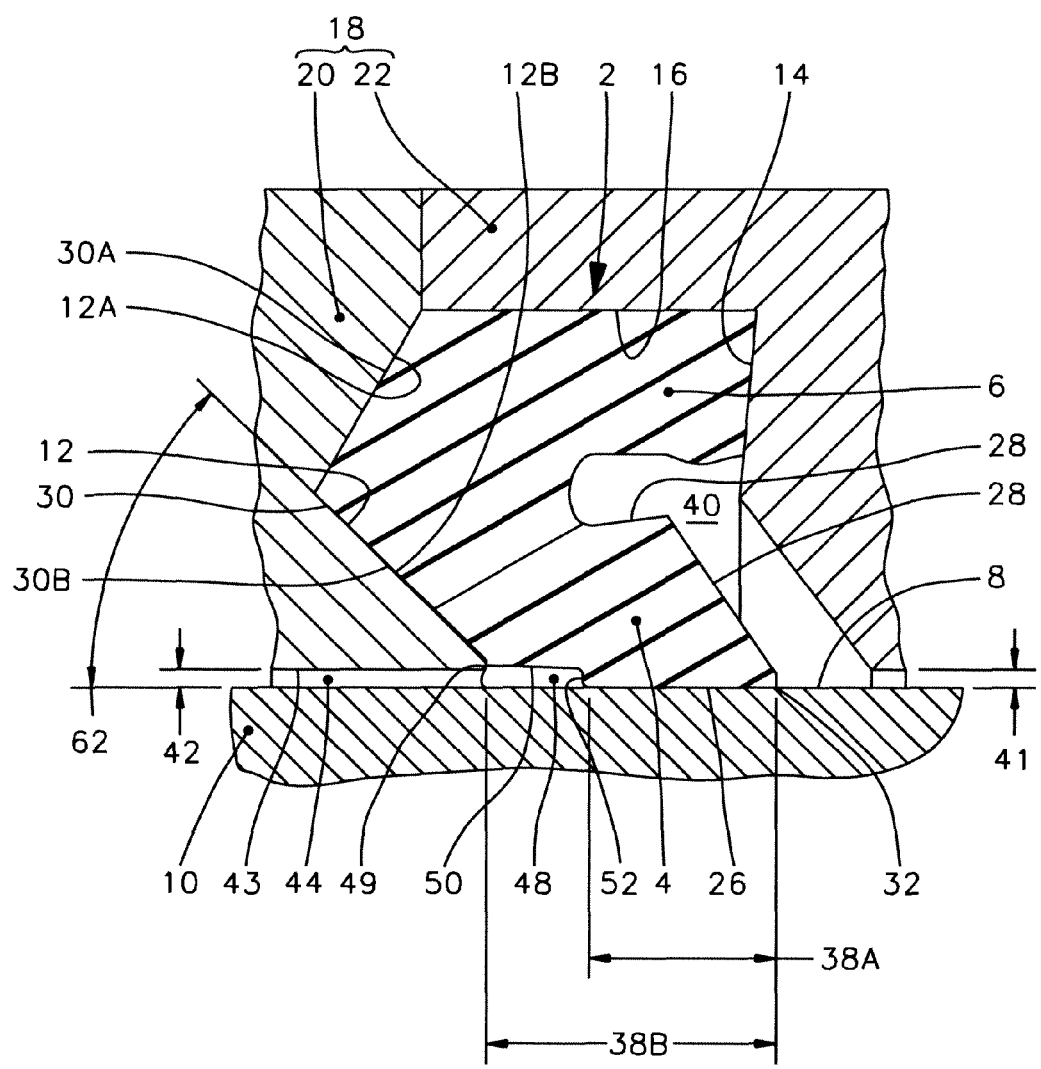

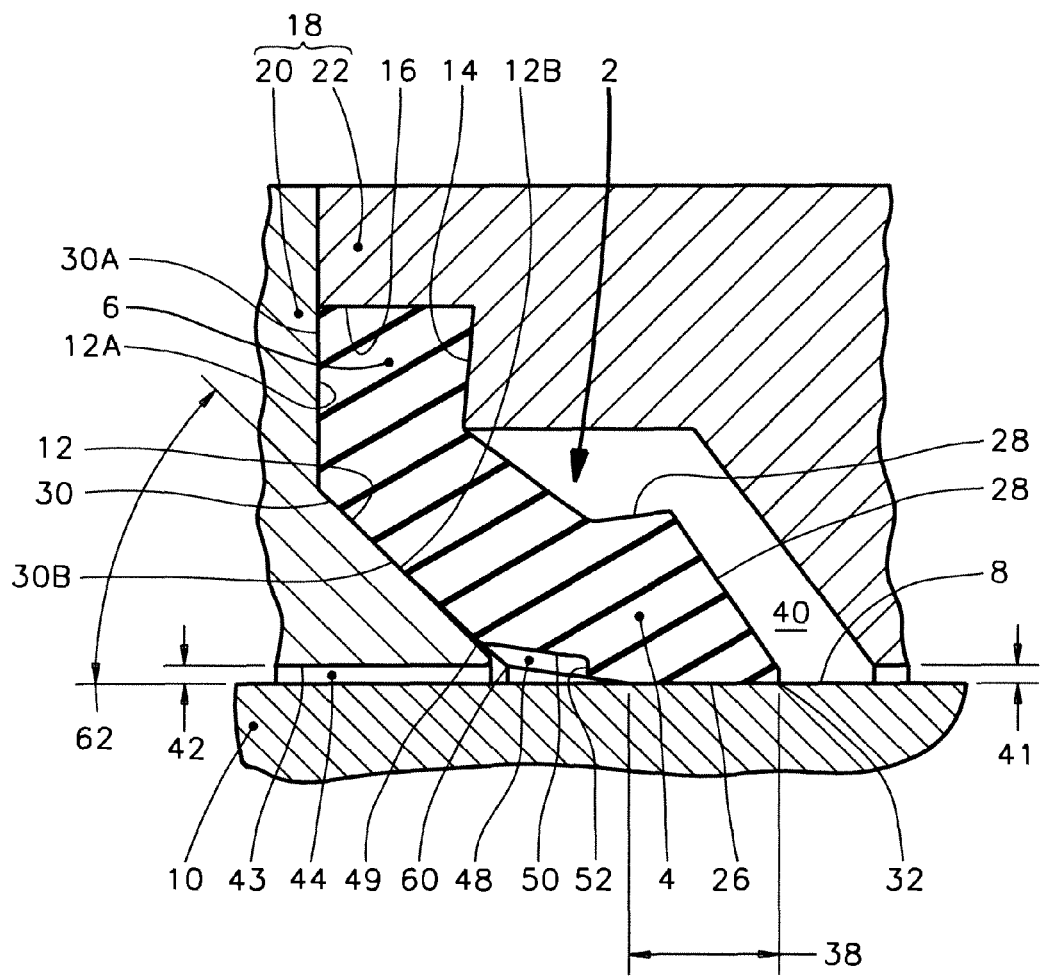

ROTARY SEAL WITH SUPPORTED INLET

CROSS-REFERENCE TO RELATED APPLICATIONS

This application claims the benefit of U.S. Provisional Patent Appln. No. 61/268,698 filed Jun. 15, 2009, entitled "Hydrodynamic Washpipe Packing Ring." U.S. Provisional Patent Appln. No. 61/268,698 is hereby incorporated by reference herein.

BACKGROUND OF THE INVENTION

1. Field of the Invention

This invention relates generally to seals that are suitable for containing a pressurized fluid that may be abrasive, and for providing a film of lubricant at the dynamic sealing interface in response to relative rotation to enhance pressure and rotary speed capabilities.

The seals of the present invention are particularly suitable for use in rotary swivel assemblies, such as the general type of oilfield washpipe assemblies that are described in U.S. Pat. No. 2,764,428 entitled "Wash Pipe Mounting For Swivels," IADC/SPE Paper 59107 "A New Hydrodynamic Washpipe Sealing System Extends Performance Envelope and Provides Economic Benefit," and commonly assigned U.S. Pat. No. 6,007,105 entitled "Swivel Seal Assembly."

2. Description of the Related Art

Rotary seals are used to establish sealing between relatively rotatable machine components, for the purpose of retaining a pressurized fluid. The type of sealing ring that is most commonly used in oilfield washpipe assemblies is typically referred to as washpipe packing, and dates at least to U.S. Pat. No. 2,394,800 entitled "Rotary Swivel." Such conventional washpipe packing is used to retain pressurized drilling fluid. Differential pressure energizes the dynamic sealing lip against the washpipe. While this type of packing has served the oilfield for many years, it is not suitable for the higher speeds and pressures of today's deep wells. The problems and extreme expenses associated with failures of conventional packing in deep wells are described in IADC/SPE Paper 59107.

The antecedents to the packings used in many other types of applications are shown, for example, in U.S. Pat. No. 2,442,687 entitled "Packing For Stuffing Boxes" and U.S. Pat. No. 2,459,472 entitled "Rotary Swivel."

In general, the term "packing" simply refers to a sealing ring that is intended to be used in a "stuffing box" of one sort or another. "Packing" and "stuffing box" are terms that date back to the 1770's, and perhaps earlier. A stuffing box is a housing with a deep cylindrical cavity that receives a plurality of packing rings. Some or all of the packing rings are often installed in abutting relation with spacer rings that perform a packing ring supporting function. For several examples of spacer/support rings, see the aforementioned U.S. Pat. Nos. 2,394,800, 2,442,687, and 2,459,472, and IADC/SPE Paper 59107.

Commonly assigned U.S. Pat. No. 6,334,619, entitled "Hydrodynamic Sealing Assembly," shows a hydrodynamically lubricated packing ring assembly that has the disadvantage of requiring an expensive wavy backup ring.

Kalsi Engineering manufactures various configurations of hydrodynamic rotary seals, and sells them under the registered trademark "KALSI SEALS." The factors involved in using such seals to contain a pressurized fluid are described in U.S. Pat. No. 6,334,619. Typical seal configurations require a lubricant pressure that is greater than, or nearly equal to, that of the contained fluid. To contain a highly pressurized fluid, one can use a pair of oppositely-facing seals; one to serve as a partition between the lubricant and the pressurized fluid, and the other to retain the lubricant, as described in conjunction with FIGS. 3-38 of the Kalsi Seals Handbook, Revision 1 (Kalsi Engineering, Inc. Document No. 2137 Revision 1, 2005). The lubricant is maintained at a pressure equal to or greater than that of the contained fluid. This scheme ensures that neither seal is exposed to a high differential pressure acting from the wrong side, but requires a special mechanism to maintain the lubricant pressure at or above that of the contained fluid.

Many applications, such as the oilfield drilling swivel, the progressive cavity artificial lift pump, centrifugal pumps, and rotary mining equipment, would benefit significantly from a hydrodynamically lubricated rotary packing ring seal having the ability to operate under conditions where pressure of the contained fluid is higher than the lubricant pressure.

SUMMARY OF THE INVENTION

The present invention is a rotary sealing arrangement that overcomes the above-described shortcomings of the prior art. The rotary seal rings of the present invention are used to establish sealing with respect to a relatively rotatable surface (such as a shaft or washpipe). A dynamic lip deforms against the relatively rotatable surface, establishing an interfacial contact footprint that varies in width from place to place.

An aspect of the present invention is to provide a simple and compact rotary sealing arrangement for containing a pressurized media such as oilfield drilling fluid, where the rotary seals employ the advantage of maintaining a film of lubricant at the dynamic sealing interface during rotary operation, without requiring the undesirable complexity of a wavy backup ring, and without the undesirable complexity of maintaining the lubricant at a pressure that is greater than the pressure of the pressurized media. Hydrodynamic geometry on a dynamic sealing lip interacts with a lubricating media during relative rotation to wedge a lubricating film into the dynamic sealing interface between the seal and the relatively rotatable surface. The lubricating film is distributed across the dynamic sealing interface and migrates toward, and into, the pressurized fluid, and thus provides a contaminant flushing action. The lubricating film reduces seal running torque, providing reduced wear and reduced seal-generated heat. In other words, the dynamic sealing lip slips or hydroplanes on a film of lubricating fluid during periods of relative rotation between the dynamic sealing lip and relatively rotatable surface. When relative rotation stops, the hydroplaning activity stops, and a static sealing relationship is re-established between dynamic sealing lip and relatively rotatable surface.

One feature of the present invention is a hydrodynamic inlet that is supported by one or more adjacent boundaries, such as a recess support corner, a first recess end and/or a support shoulder, in order to resist differential pressure-induced inlet collapse, so as to retain the hydrodynamic wedging function of the hydrodynamic inlet despite the high differential pressure acting across the rotary seal.

The dynamic sealing surface is preferably interrupted by angled slots/recesses that have a shelf-like shape on at least one side thereof. The slots/recesses incorporate a hydrodynamic inlet shape having an end that may be approximately tangent with the dynamic sealing surface.

The shelf-like shape or shapes prevent the slots/recesses from collapsing completely against the shaft when the pressure of the contained fluid is higher than that of the seal lubricant. The lubricant is swept into the dynamic interface between the dynamic sealing surface and the washpipe, at the location near the extrusion gap where it is needed most for interfacial lubrication. A shelf-like shape also creates an angled zone of locally increased interfacial contact pressure that diverts lubricant film toward the environment-side edge of the dynamic sealing surface.

A feature of a preferred embodiment of the present invention is compatibility with the type of conventional packing ring support structure that is found in conventional stuffing boxes, including, but not limited to, the washpipe assemblies that are used in oil and gas well drilling.

An optional feature of the present invention is the compression of a portion of a static sealing rim between a first sealing housing component and a second sealing housing component to establish a static sealed relationship between the first and second sealing housing components, and to prevent rotation of the seal/packing relative to the first and second seal housing components.

It is intended that the seal of the present invention may incorporate one or more seal materials without departing from the spirit or scope of the invention, and may be composed of any suitable sealing material, including elastomeric or rubber-like materials that may, if desired, be combined with various plastic materials such as reinforced polytetrafluoroethylene ("PTFE") based plastic. If desired, the rotary seals may be of monolithic integral, one piece construction or may also incorporate different materials bonded, co-vulcanized, or otherwise joined together to form a composite structure. For use as an oilfield washpipe packing, a preferred seal material is a fabric reinforced elastomer compound.

BRIEF DESCRIPTION OF THE SEVERAL VIEWS OF THE DRAWINGS

So that the manner in which the above recited features, advantages, and objects of the present invention are attained and can be understood in detail, a more particular description of the invention, briefly summarized above, may be had by reference to the embodiments thereof that are illustrated in the appended drawings. It is to be noted, however, that the appended drawings only illustrate preferred embodiments of this invention, and are therefore not to be considered limiting of its scope, for the invention may admit to other equally effective embodiments that vary only in specific detail.

In the drawings:

FIG. 1C is a fragmentary cross-sectional view of the ring-shaped hydrodynamic seal shown in FIG. 1A in an installed condition and in the presence of differential pressure;

FIGS. 2-4 are fragmentary cross-sectional views of a ring-shaped hydrodynamic seal according to other preferred embodiments of the present invention;

DESCRIPTION OF THE PREFERRED EMBODIMENTS

FIGS. 1A-1D

FIGS. 1A, 1B 1C and 1D are views representing one preferred embodiment of the present invention, and should be studied together, in order to attain a more complete understanding of the invention. Features throughout this specification that are represented by like numbers have the same function. While the invention is readily adaptable to various sealing configurations, FIGS. 1A-1D illustrate the invention in the context of an oilfield washpipe packing-type seal, and disclose how to achieve hydrodynamic interfacial lubrication using a novel collapse-resistant hydrodynamic inlet geometry.

Figure 1A:
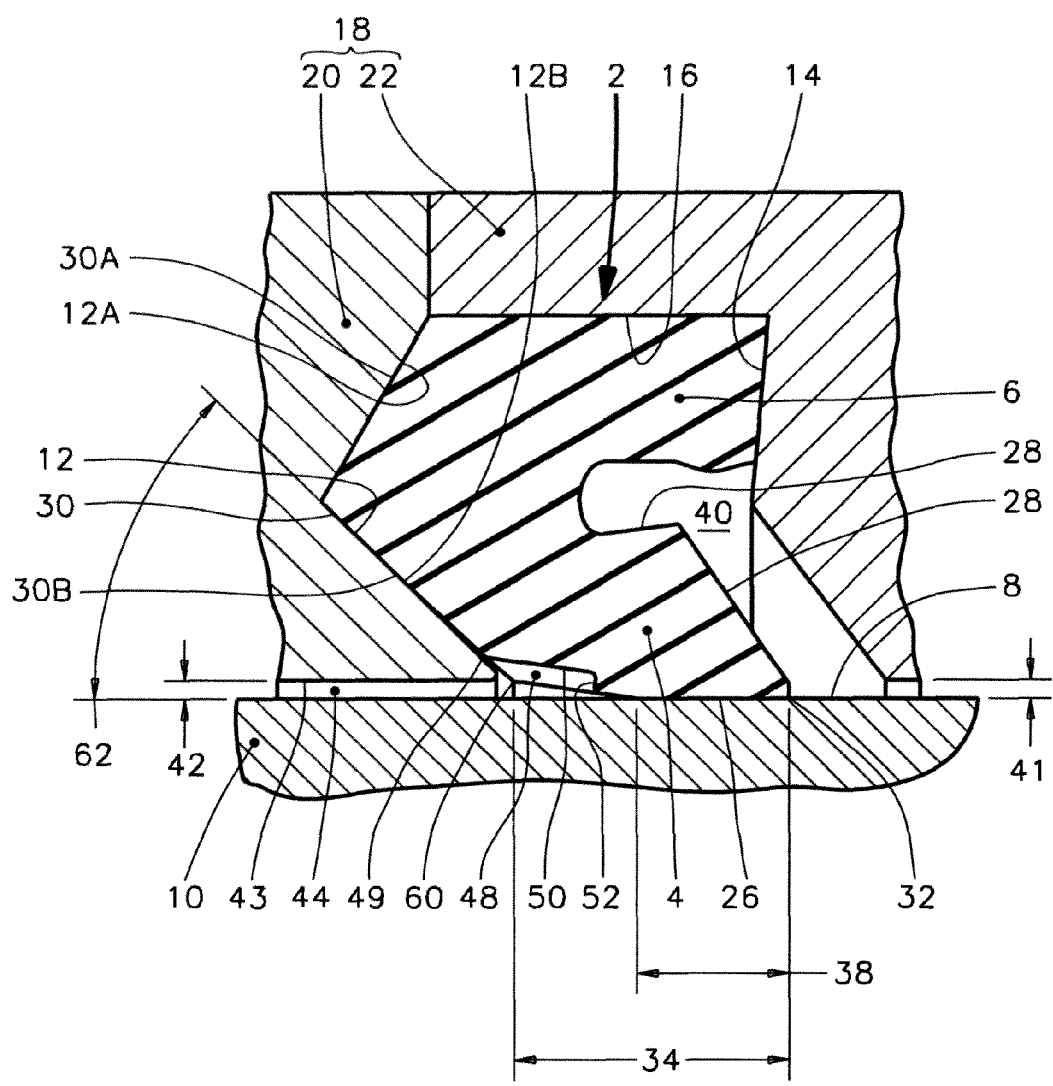
FIG. 1A is a fragmentary cross-sectional view of a ring-shaped hydrodynamic seal according to a preferred embodiment of the present invention, the seal shown in an installed condition in the absence of differential pressure.
Figure 1B:
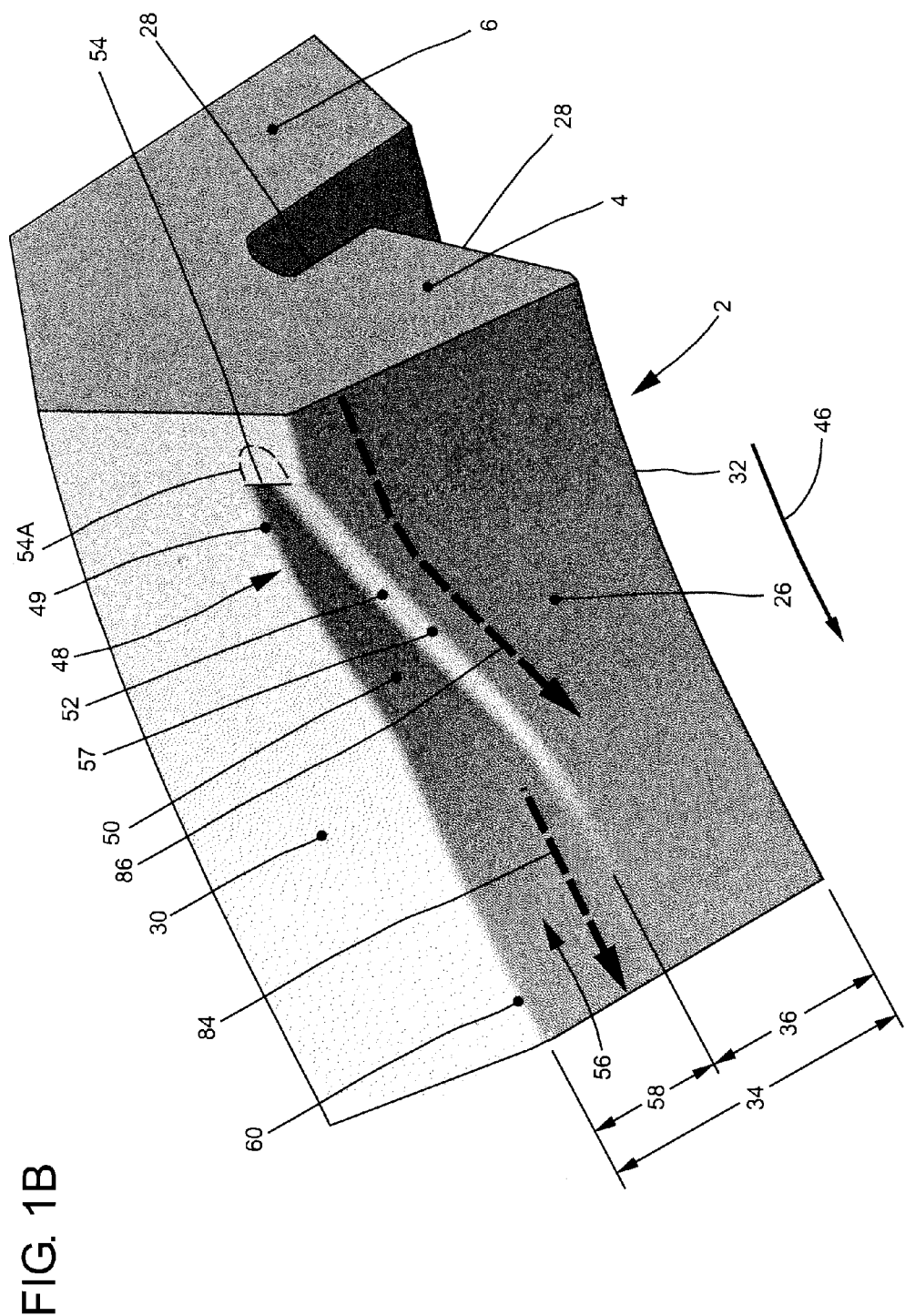
FIG. 1B is a fragmentary shaded perspective view of a preferred embodiment of the hydrodynamic seal in an uninstalled state.
Figure 1D:
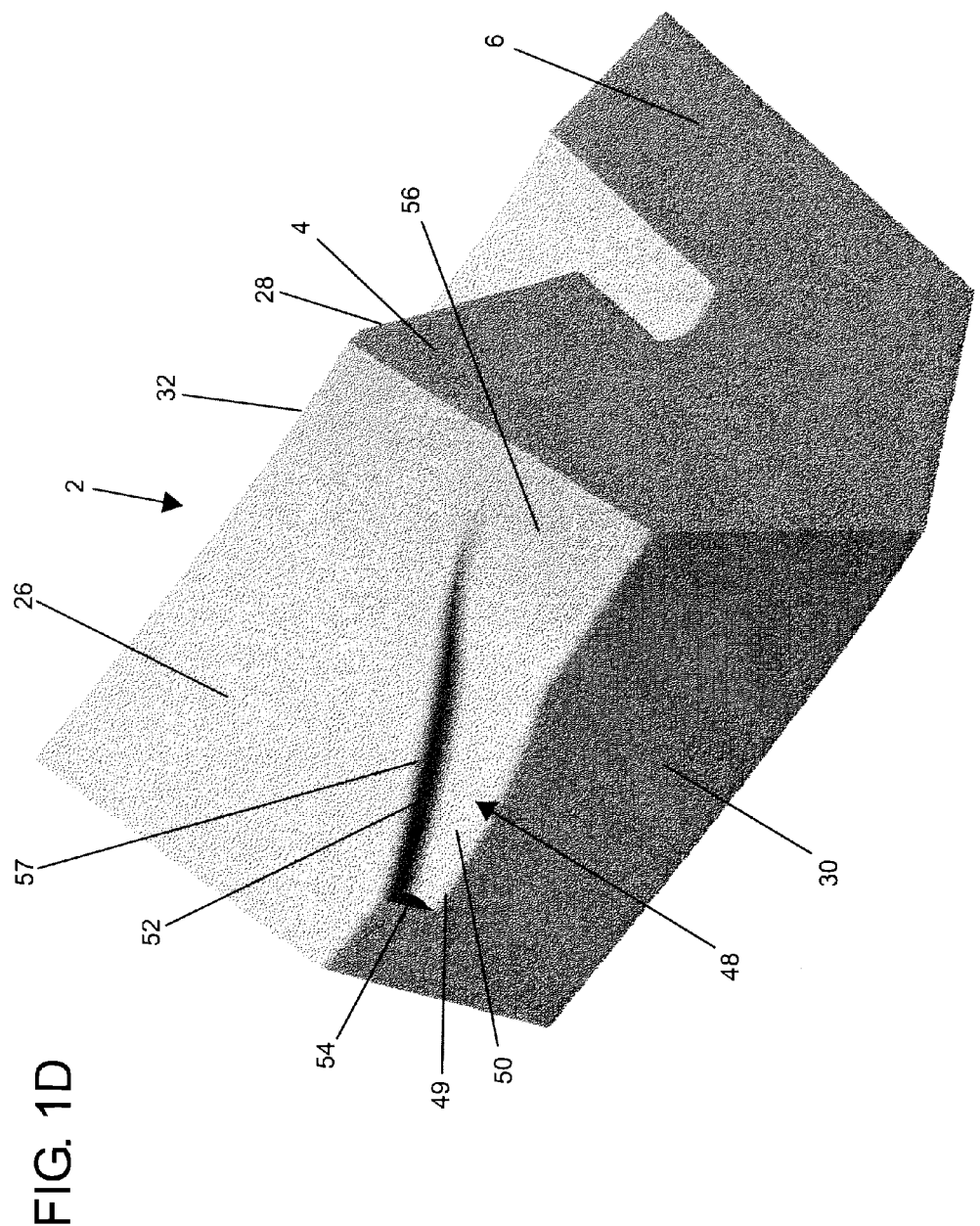
FIG. 1D is a fragmentary shaded perspective view of the hydrodynamic seal of FIG. 1B taken from a different perspective.

The rotary seal of a preferred embodiment of the present invention is illustrated generally at 2 in its installed condition, in the absence of differential pressure in FIG. 1A, and FIG. 1C illustrates the rotary seal 2 in its installed condition in the presence of differential pressure. FIGS. 1B and 1D show two different perspective views of the rotary seal 2 in its uninstalled, uncompressed condition.

With reference to FIGS. 1B and 1D, the rotary seal 2 has a ring-like, generally circular configuration. In other words, the rotary seal is a seal body that forms a ring. As with the seal of U.S. Pat. No. 2,394,800, the cross-section of the seal has a generally V-shape, with one side of the "V" clamped in compression, and the other side of the "V" providing a dynamic sealing function as shown in FIGS. 1A and 1C.

The terms "ring-like" and "ring" are used with the understanding that the term "ring" is commonly understood to encompass shapes other than perfectly circular. As an example, a decorative finger ring often has beaded edges or a sculpted shape, yet is still called a ring. As another example, the "ring" of U.S. Pat. No. 1,462,205 is not everywhere circular. There are thousands of precedents for using the term "ring-like" in a patent, and many patents use the term in conjunction with a seal or a body of a seal. For example, see U.S. Pat. Nos. 612,890, 4,361,332, 4,494,759, 4,610,319, 4,660,839, 4,909,520, 5,029,879, 5,230,520, 5,584,271, 5,678,829, 5,833,245, 5,873,576, 6,109,618, and 6,120,036. Note that in many of the examples, the seal in question has features that result in the shape not being everywhere circular. For example, in some cases the dynamic lip of the ring-like seal has a wavy lubricant-side shape.

The rotary seal 2, being a generally circular ring, defines a theoretical axis. While the theoretical axis is not illustrated, the term "axis" is well-understood in the art, and in the field of drafting is sometimes illustrated using a centerline. For orientation purposes, it should be understood that in all of the cross-sectional views herein, the cutting plane of the cross-section is aligned with and passes through the theoretical axis of the rotary seal 2; i.e., the theoretical centerline lies on the cutting plane. The circumferential direction of relative rotation is normal (perpendicular) to the plane of the cross-section, and the theoretical centerline of rotary seal 2 generally coincides with the axis of relative rotation.

Referring to FIGS. 1A-1D, the rotary seal 2 includes a dynamic sealing lip 4 of generally annular form and a static sealing rim 6 of generally annular form. The static sealing rim 6 is sometimes referred to in the art as a "static sealing lip." The static sealing rim 6 is typically oriented in generally opposed relation to the dynamic sealing lip 4, but designs are possible where the static sealing rim 6 is not oriented in opposed relation to the dynamic sealing lip 4.

In the preferred embodiment of the present invention, the dynamic sealing lip 4 and the static sealing rim 6 are integral features of the rotary seal 2. The dynamic sealing lip 4 is adapted for sealing against a relatively rotatable surface 8 of a first machine component 10 as shown in FIGS. 1A and 1C. In an oilfield washpipe assembly, the first machine component 10 is the washpipe.

The rotary seal 2 is installed within a seal groove that is typically defined by a first groove wall 12, a second groove wall 14, and a peripheral wall 16. The seal groove and the relatively rotatable surface 8 together form what is commonly called a seal gland. The peripheral wall 16 is positioned in spaced relation to the relatively rotatable surface 8. Seal gland arrangements are possible where the second groove wall 14 is unnecessary. When the second groove wall 14 is used, it is positioned in spaced relation to the first groove wall 12.

The seal groove is preferably defined by a second machine component 18 that may be formed of one or more components. In FIGS. 1A and 1C, the second machine component 18 is an assembly formed by two separable components, a first spacer ring 20 and a second spacer ring 22. The rotary seal 2 is oriented (i.e., positioned) by the second machine component 18 for sealing with respect to the relatively rotatable surface 8 of the first machine component 10.

If desired, the first spacer ring 20 and a second spacer ring 22 can be generally shaped like the conventional spacer rings that are shown in the conventional washpipe assembly of FIG. 11 of IADC/SPE Paper 59107. The seals of the present invention may, if desired, be shaped to fit directly into such conventional washpipe assemblies as replacement packing elements.

The first spacer ring 20 and the second spacer ring 22 may be retained or attached together by any suitable retaining or attachment means, including, for example, threaded means such as threads, bolts, screws, studs, hammer unions, etc., and including external clamping means, bayonet-type latches, deformable rims or tangs, retaining ring(s), welding, soldering, bonding, friction, interference fit, etc., without departing from the spirit or scope of the invention. The first and second spacer rings 20 and 22 may be made from any suitable material, such as, for example, metal, plastic or reinforced plastic, or a combination thereof.

The most common method for securing the first spacer ring 20 and the second spacer ring 22 together is to axially clamp them inside of a housing, as shown, for example, in U.S. Pat. No. 2,394,800 and FIG. 11 of IADC/SPE Paper 59107. As shown in U.S. Pat. No. 2,394,800, FIG. 11 of IADC/SPE Paper 59107, and FIGS. 5 and 6 herein, the spacer rings may, if desired, incorporate one or more lubricant communication passages such as drilled holes. If desired, the first spacer ring 20 and the second spacer ring 22 can have a sealed relationship with a mating housing, as shown in FIG. 6 of commonly assigned U.S. Pat. No. 6,334,619.

Although the second machine component 18 is illustrated as an assembly formed by two separable components, such is not intended to limit the scope of the invention. The manner of positioning the rotary seal 2 admits to other equally suitable forms. For example, the rotary seal 2 could be configured for installation within a groove that is formed in a second machine component 18 that is of one piece construction.

On a washpipe, the relatively rotatable surface 8 is an external cylindrical shape. Although the invention is disclosed here in the context of a familiar washpipe packing-type of seal, such is not intended to limit the configuration of the relatively rotatable surface 8. It is well-established that hydrodynamic rotary seals can be configured for, and used in, both radial- and face-sealing applications.

Relatively rotatable surface 8 can take the form of an externally- or internally-oriented, substantially cylindrical surface, as desired, with rotary seal 2 positioned radially between peripheral wall 16 and relatively rotatable surface 8, in which case the axis of relative rotation would be substantially parallel to relatively rotatable surface 8. In a radial sealing configuration, dynamic sealing lip 4 is oriented for compression in a substantially radial direction, and peripheral wall 16 may, if desired, be of substantially cylindrical configuration.

Alternatively, relatively rotatable surface 8 can take the form of a substantially planar surface, with rotary seal 2 compressed axially between peripheral wall 16 and relatively rotatable surface 8 in a "face-sealing" arrangement, in which case the axis of relative rotation would be substantially perpendicular to relatively rotatable surface 8. In an axial (face) sealing configuration, dynamic sealing lip 4 is oriented for compression in a substantially axial direction, and peripheral wall 16 may be of substantially planar configuration. In what is contemplated to become the most common configuration, relatively rotatable surface 8 is the external cylindrical surface of a shaft, sleeve, or washpipe.

In summary, the rotary seal 2 can be configured for uses as a radial seal or a face seal by configuring the dynamic sealing lip 4 to be located at either the inside diameter, the outside diameter, or the end of the seal, while maintaining the advantages of the invention that are disclosed herein.

The static sealing rim 6 is adapted for sealing with respect to the second machine component 18. Typically, the static sealing rim 6 is adapted for sealing with respect to the second machine component 18 by virtue of being adapted to establish sealing contact pressure with respect to the second machine component 18. This sealing contact pressure is typically achieved by having some part of the static sealing rim 6 in compressed contact with the second machine component 18. However it is achieved, when the rotary seal 2 is installed, the static sealing rim 6 establishes a sealed relationship with the second machine component 18. In the example shown in FIGS. 1A and 1C, the sealed relationship with the second machine component 18 is established by axial clamping of the static sealing rim 6 between the first spacer ring 20 and the second spacer ring 22. This is not meant to imply that the invention is limited to seals having a sealing rim 6 that is axially clamped. Other means of establishing a sealed relationship between a static sealing rim 6 and a second machine component are known in the art, and are applicable to the present invention. For example, an energizer element 72 such as a spring (FIG. 6), or an elastomer element (FIG. 5) can be used to establish the sealing contact pressure. For another example, interference is sometimes used to establish the sealing contact pressure.

The dynamic sealing lip 4 incorporates a dynamic sealing surface 26 for sealing contact with the relatively rotatable surface 8. In the uncompressed state of the rotary seal 2 (FIGS. 1B and 1D), the dynamic sealing surface 26 is preferably tapered, assuming the general shape of a truncated cone. The dynamic sealing lip 4 also includes at least one force receiving surface 28. The force receiving surface 28 can be of any suitable shape that performs the functions described herein that the force receiving surface 28 serves.

The rotary seal 2 may be composed of any suitable sealing material, including, for example, elastomeric or rubber-like materials such as an elastomer compound or a combination of one or more elastomer compounds, various plastic materials, different materials bonded together to form a composite structure or inter-fitted together, or a combination of a suitable plastic and an elastomer compound. It is preferred, however, that the seal 2 be made from a reinforced material, such as fabric-reinforced elastomer compound.

For use in oilfield washpipe assemblies, the rotary seal 2 is typically made primarily from a fabric-reinforced elastomer compound. Commonly used materials include cotton fabric-reinforced nitrile rubber (NBR), cotton fabric-reinforced hydrogenated nitrile rubber (HNBR), and aramid fabric-reinforced HNBR. As is commonly done with oilfield washpipe packings, a local end portion of the static sealing rim 6 may be constructed of a ring of homogeneous elastomer compound (for example, see FIG. 4).

It is commonly understood by those of ordinary skill in the art that elastomers used in seal construction are compounds that include one or more base elastomers. Such base elastomers include, but are not limited to, HNBR (hydrogenated nitrile rubber), HSN (highly saturated nitrile), FKM (fluorocarbon rubber), FEPM (also known as TFE/P or tetrafluoroethylene and propylene copolymer), and EPDM (ethylene propylene diene monomer). Such compounds may include other compounding agents including fillers, processing aids, anti-degradants, vulcanizing agents, accelerators, and activators. The effects of the ingredients used are generally understood by those of ordinary skill in the art of compounding elastomers. Likewise, the ingredients used in manufacturing plastics that are used in seal construction are generally understood by those of ordinary skill in the art of developing plastic seal materials.

A low pressure end 30 of the rotary seal 2 has a surface that generally faces the first groove wall 12, and is adapted for being in supporting contact therewith. As shown in FIGS. 1A-1C, if preferred, the low pressure end 30 can have a "V" shape when viewed in cross-section, for being supported by a mating V-shaped first groove wall 12. This aspect of rotary seal 2 is simply part of the basic, well-known washpipe packing geometry shown, for example, in FIG. 3 of U.S. Pat. No. 2,394,800. Referring to FIG. 1B, the transition between the dynamic sealing surface 26 and the low pressure end 30 is referred to herein as the lubricant end transition 60.

When the low pressure end 30 and the first groove wall 12 have mating "V" shapes, the first groove wall 12 comprises first wall part 12A and first wall part 12B, and the low pressure end 30 comprises low pressure end portion 30A and low pressure end portion 30B as shown in FIGS. 1A and 1C.

The first groove wall 12 forms a support surface for the rotary seal 2. As shown, it is preferable that at least a portion of the first groove wall 12 (i.e., first wall part 12B) establishes a tapered (i.e., shaped like a portion of a cone) support surface for the rotary seal 2. Preferably, any remaining portion of the first groove wall 12 establishes the first wall part 12A. A part of the first groove wall 12 is preferably angulated, establishing an acute included angle 62 with respect to the relatively rotatable surface 8 of the first machine component 10.

The rotary seal 2 is designed for relative rotation with respect to the relatively rotatable surface 8. It is to be understood that this relative rotation can be achieved by rotating the first machine component 10, or by rotating the rotary seal 2, or by simultaneously rotating both the rotary seal 2 and the first machine component 10 independently. If the rotary seal 2 is to be rotated, it is preferred that it be accomplished by rotating the second machine component 18. Referring to FIG. 1B, the rotary seal 2 shown is adapted for a relatively rotatable surface 8 of a first machine component 10 (e.g., a shaft) having a direction of relative rotation represented by the arrow 46 (i.e., the shaft rotation being shown in a counter-clockwise direction). The seal design is reversed (i.e., made in a minor image version) for applications in which the relatively rotatable surface 8 has a direction of relative rotation 46 opposite of that shown in FIG. 1B (i.e., the shaft rotating in a clockwise direction). If the rotary seal design shown in FIG. 1B rotates around a stationary shaft, it is to be understood that the seal would rotate in a clockwise direction.

The rotary seal 2 preferably has an exclusion edge 32 that is preferably generally circular, in accordance with the teachings of the prior art. When the rotary seal 2 is installed, the exclusion edge 32 contacts the relatively rotatable surface 8 as shown in FIG. 1A. The exclusion edge 32 is formed by an intersection between the dynamic sealing surface 26 and an adjacent surface of the dynamic sealing lip 4, as shown. Due to the exclusion edge 32 being substantially circular, it is substantially aligned with the possible directions of relative rotation, so that it does not produce a hydrodynamic wedging action in response to relative rotation, thereby facilitating containment of a contained media 40.

Since perfect theoretical circularity is seldom if ever obtainable in any feature of any manufactured product in practice, it is to be understood that when "circular," "substantially circular," "substantial circularity," or similar terms are used to describe attributes of the invention, the terms are not to be misconstrued as an intent to achieve the unobtainable; i.e., perfect theoretical circularity.

As illustrated in FIG. 1B, the dynamic sealing surface 26 has a maximum surface width 34 and a minimum surface width 36. When rotary seal 2 is installed, the dynamic sealing lip 4 is deformed into contact with the relatively rotatable surface 8, and the portion of the dynamic sealing surface 26 near the exclusion edge 32 contacts the first machine component, establishing an interfacial contact footprint having an interfacial contact footprint width 38 as shown in FIG. 1A. The interfacial contact footprint is often referred to as the "interface" or the "sealing interface." (It is understood and rather well known in the industry that when extremely stiff aramid fabric-reinforced elastomer is used in packing construction, actual complete sealing doesn't occur with thin viscosity fluids until some level of differential pressure is applied. This is due to the fabric-induced surface texture of the dynamic sealing surface 26. Nevertheless, the interfacial contact footprint of such seals can be, and sometimes is, referred to within the industry as the "sealing interface.") When relative rotation occurs between the rotary seal 2 and the relatively rotatable surface 8, the above-described interface becomes a dynamic interface, and is often referred to as the "dynamic sealing interface."

The rotary seal 2 is used to retain the contained media 40, which is from time to time maintained at an elevated pressure. For the purposes of this specification, the term "contained media" encompasses any media that the rotary seal 2 may be required to retain, such as, but not limited to, drilling fluid, other types of fluid, dirt, crushed rock, manure, dust, lubricating media, a process media, seawater, air, sand, metallic projectiles, plastic pellets, etc. For purposes of this specification, the term "fluid" has its broadest meaning, encompassing both liquids and gases.

In an oilfield washpipe assembly, the contained media 40 is drilling fluid, which is also known as drilling mud. The contained media 40 is typically communicated to the rotary seal 2 by a media passage 41 that is typically established by clearance between the first machine component 10 and the second machine component 18 as shown in FIG. 1A.

Still referring to FIG. 1A, a lubricant passage 42 is typically provided, and is typically established by the clearance between the first machine component 10 and an extrusion gap bore 43 of the second machine component 18. A lubricant 44 is located within the lubricant passage 42. Within the industry, the lubricant passage 42 is also referred to as the "extrusion gap" or the "extrusion gap clearance." The lubricant 44 is preferably a liquid-type lubricant such as a synthetic or natural oil, or a lubricating grease. Other types of fluids, however, are also suitable in some applications. The first groove wall 12 and the extrusion gap bore 43 preferably intersect in acute angular relation and preferably form a generally circular intersection. It should be understood, however, that the intersection can be rounded (as shown) or chamfered to eliminate the sharpness of the intersection.

The extrusion gap bore 43 may, if desired, establish a journal bearing relationship with the relatively rotatable surface 8, and that journal bearing relationship may be used to guide the relatively rotatable surface 8 relative to the second machine component 18, or vice-versa.

The lubricant 44 is preferably fed into the lubricant passage 42 from some type of lubricant supply. Various types of lubricant supply systems are known in the art. For example, see the various types of lubricant supply systems that are shown and/or described in the publicly available Kalsi Seals Handbook, Revision 1 and the lubricant supplies shown in various U.S. Patents, such as, for example, U.S. Pat. Nos. 5,195,754, 5,279,365, 6,007,105, and 6,227,547.

The purposes of the rotary seal 2 of the preferred embodiment are to establish sealing engagement with the relatively rotatable surface 8 of the first machine component 10 and with the second machine component 18, to retain the contained media 40, and to cause a film of the lubricant 44 to migrate toward and preferably into the contained media 40 for lubrication of the rotary seal 2 and the relatively rotatable surface 8, and for flushing purposes.

When the pressure of the contained media 40 is greater than the pressure of the lubricant 44 as illustrated in FIG. 1C, the resulting differential pressure imposes force on the force receiving surface 28, which flattens more of the dynamic sealing lip 4 against the relatively rotatable surface 8 and causes the contact footprint width 38 to increase; i.e. the footprint spreads. At some level of differential pressure between the contained media 40 and the lubricant 44, the maximum local size of the contact footprint width 38 can equal or even slightly exceed the maximum surface width 34 of the dynamic sealing surface 26.

When the pressure of the contained media 40 is greater than the pressure of the lubricant 44, the resulting differential pressure also deforms the rotary seal 2 in a way that causes all or substantially all of the low pressure end 30 of the rotary seal 2 to be in contact with the first groove wall 12. Thus, the rotary seal 2 is supported against the pressure of the contained media 40 by the first groove wall 12, as taught by U.S. Pat. No. 2,394,800. Within the seal industry, the first groove wall 12 is sometimes referred to as the "lubricant-side wall," and the second groove wall 14 is sometimes referred to as the "environment-side wall."

The dynamic sealing lip 4 has at least one recess 48 of the general type disclosed in more detail below in conjunction with FIGS. 1B and 1D. The sectional views herein, such as FIG. 1A, are intended to be interpreted by the standard conventions of multi and sectional view orthographic drawing projection practiced in the United States and described in ANSI Y14.3-1975, an industry standardization document promulgated by ASME. Section 3-4.2.1 of ANSI Y14.3-1975 has been interpreted to mean that the circumferentially solid portions of the seal, such as the portion of the dynamic sealing lip 4 to the right of the recess 48, should be crosshatched in sectional view, while the recess 48 should be drawn in outline form without crosshatch lines to avoid conveying a false impression of circumferential solidity. This ASME Section 3-4.2.1-based cross-sectional illustration technique has been employed within the sealing industry in this manner for many years.

The recess 48 comprises a hydrodynamic ramp 50 and a recess flank 52. The recess flank 52 is preferably adjacent to the hydrodynamic ramp 50, as shown. The recess flank 52 preferably forms a ledge, as shown in FIGS. 1B and 1D. Preferably, at least part of the recess flank 52 is skewed with respect to the direction of relative rotation 46 between the rotary seal 2 and the first machine component 10. This skewed orientation is more readily apparent in the fragmentary shaded perspective views of FIGS. 1B and 1D, which illustrates the recess 48 in more detail. For example, as the recess flank 52 traverses the dynamic sealing surface 26 circumferentially, it may taper from a position adjacent the low pressure end 30 toward the exclusion edge 32, as shown in FIGS. 1B and 1D. The purpose of the hydrodynamic ramp 50 is to establish a gently converging relationship with the relatively rotatable surface 8 in the circumferential direction, in order to serve as a hydrodynamic inlet that, in response to relative rotation, hydrodynamically wedges a film of lubricant into the interface between the dynamic sealing surface 26 and the relatively rotatable surface 8 of the first machine component 10. Where the recess 48 interrupts (i.e., cuts into) the low pressure end portion 30, it preferably establishes at least one recess support corner 49.

A principal aspect of the recess 48 is that it is exposed to and contains some of the lubricant 44, and thereby allows at least a part of the hydrodynamic ramp 50 to be exposed to the lubricant 44. One purpose of the recess flank 52 is to support the recess 48 against total collapse when the pressure of the contained media 40 is greater than the pressure of the lubricant 44 (FIG. 1C), so that the recess 48 remains exposed to and preferably filled with the lubricant 44, so that the hydrodynamic ramp 50 can perform its hydrodynamic wedging function. Another purpose of the recess flank 52 is to create a zone of elevated interfacial contact pressure within the sealing interface. Preferably, as discussed above, at least part of that zone of elevated interfacial contact pressure is skewed with respect to the direction of relative rotation between the first machine component 10 and the rotary seal 2, in order to divert lubricant film toward and past the exclusion edge 32, and into the contained media 40.

Referring to FIGS. 1B and 1D, the recess 48 has a first recess end shown generally at 54, and a second recess end shown generally at 56. The second recess end 56 is spaced from the first recess end 54, and the spacing is generally in the circumferential direction. As a result, the recess 48 can be said to have a circumferential length. The recess flank 52 preferably tapers off to nothing at the second recess end 56, merging smoothly with the dynamic sealing surface 26. The entire recess 48 preferably merges smoothly into the dynamic sealing surface 26 at the second recess end 56 as shown, having some depth at the first recess end and preferably tapering to no depth at the second recess end 56.

The recess 48 preferably interrupts (i.e., cuts into) both the dynamic sealing surface 26 and the low pressure end 30. The dynamic sealing surface 26 varies locally in its width along its circumference as a result of the recess 48. Preferably, at least part of the recess flank 52 is skewed relative to the direction of relative rotation 46. For example, and as disclosed above, as the recess flank 52 traverses the dynamic sealing surface 26 circumferentially, it may taper from a position adjacent the low pressure end 30 toward the exclusion edge 32, as shown in FIGS. 1B and 1D. Where the recess 48 interrupts (i.e., cuts into) the low pressure end 30, it preferably establishes at least one recess support corner 49 that may, if desired, be rounded as shown. If desired, the recess flank 52 can be oriented substantially perpendicular to the ramp 50 at or adjacent the first recess end 54. Optionally, the recess flank 52 can be oriented substantially perpendicular to the dynamic sealing surface 26 at or adjacent the first recess end 54.

The first recess end 54 preferably forms a closed end, as shown. The closed end is preferred because it supports the recess 48 against collapse when differential pressure is acting on the rotary seal 2 in its installed state, thereby preserving lubricant communication to the hydrodynamic ramp 50. Because the first recess end 54 preferably forms a closed end, the recess 48 ends abruptly, rather than passing on through and forming the alternate first recess end 54A that is represented by a dashed line in FIG. 1B. In the presence of differential pressure, the recess 48 is supported on three of its sides via contact between those sides and the first and second machine components 10 and 18 of FIG. 1C.

At least one support shoulder 57 is incorporated along or near the side of the recess 48 that is oriented toward the exclusion edge 32. The support shoulder 57 is preferably relatively abrupt near the first recess end 54, and preferably merges smoothly into the dynamic sealing surface 26 at or near the second recess end 56. If desired, the support shoulder 57 can, as shown, form the transition between the recess flank 52 and the dynamic sealing surface 26.

Figure 3:
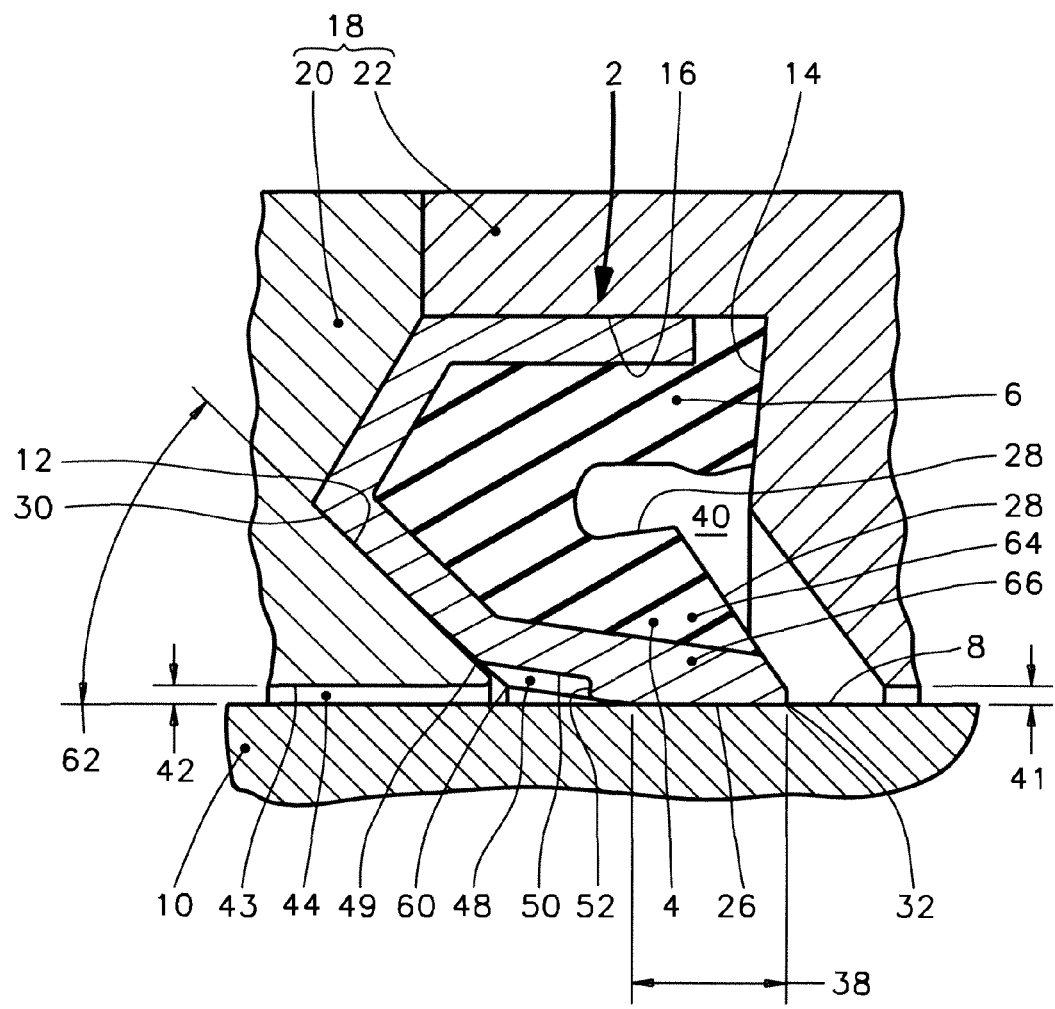

As shown in FIG. 1A, the rotary seal 2 may be installed into a seal gland arrangement that is similar to that shown by FIG. 3 of U.S. Pat. No. 2,394,800. The functional reason that the recess 48 cuts into the low pressure end portion 30B of the rotary seal 2 is to provide a lubricant passageway to feed lubricant into the recess 48 when most or all of the dynamic sealing surface 26 is forced into contact with the relatively rotatable surface by the force of the pressure of the contained media 40 acting on the at least one force receiving surface 28.

As measured relative to the dynamic sealing surface 26, the recess 48 preferably has maximum depth at or near the first recess end 54, as shown in FIG. 1B, and this depth gradually diminishes along the circumferential length of the recess 48, preferably becoming zero (no depth) at the second recess end 56. The change in depth of the recess 48 is established by the slope of the hydrodynamic ramp 50 relative to the dynamic sealing surface 26. Preferably, the hydrodynamic ramp 50 merges smoothly into the dynamic sealing surface 26 at the second recess end 56 as shown, without producing a facet. The recess 48 preferably has a maximum recess width 58 at the second recess end 56, and is preferably narrower at the first recess end 54. By varying the width of the recess 48 as shown, the recess 48 has maximum support against pressure induced collapse near the first recess end 54 because the recess support corner 49, the support shoulder 57, and the first recess end 54 are in close proximity to one another and the recess 48 is relatively deep, as measured relative to the dynamic sealing surface 26.

As previously described, the dynamic sealing surface 26 has a maximum surface width 34 and a minimum surface width 36. The minimum surface width 36 is equal to the maximum surface width 34 minus the maximum recess width 58.

In the absence of differential pressure, some of the area of the dynamic sealing surface 26 near the exclusion edge 32 contacts the relatively rotatable surface of the first machine component, establishing an interfacial contact footprint of some width (as shown, for example, in FIG. 1A).

When the force produced by high differential pressure acts on the at least one force receiving surface 28, additional area of the dynamic sealing surface 26 is deformed into contact with the relatively rotatable surface 8, causing more of the dynamic sealing surface 26 to contact the relatively rotatable surface 8; i.e., the footprint spreads. Typically, at some high enough magnitude of differential pressure, all or nearly all of the dynamic sealing surface 26 is deformed into contact with the relatively rotatable surface 8. It is possible that even a small portion of the low pressure end 30 near the lubricant end transition 60 might also be brought into contact with the relatively rotatable surface 8 when the rotary seal 2 is exposed to severe differential pressure.

If desired, the maximum recess width 58 can be sized such that no portion of the hydrodynamic ramp 50 at the second recess end 56 engages the relatively rotatable surface 8 of the first machine component 10 in the absence of differential pressure. That is, the hydrodynamic ramp 50 would only begin to engage the relatively rotatable surface 8 of the first machine component 10 and perform a hydrodynamic wedging function when some level of differential pressure is applied across the rotary seal 2. When so designed, the hydrodynamic ramp 50 does not serve any hydrodynamic wedging function until the differential pressure applied across the rotary seal 2 is sufficient to cause a portion of the hydrodynamic ramp 50 to contact the relatively rotatable surface 8 of the first machine component 10. When so designed, the hydrodynamic wedging action provided by the hydrodynamic ramp 50 provides a progressively stronger hydrodynamic wedging action as the differential pressure increases and brings more of the dynamic sealing surface 26 and more of the width of the hydrodynamic ramp 50 into contact with the relatively rotatable surface 8 of the first machine component 10. In other words, the hydrodynamic ramp 50 can be configured to provide more hydrodynamic interfacial lubrication when more lubrication is needed due to the higher differential pressure.

Alternately, if desired, the maximum recess width 58 can be designed so that at least a portion of the hydrodynamic ramp 50 at the second recess end 56 already engages the relatively rotatable surface 8 of the first machine component 10 at the time of installation, even in the absence of differential pressure. When so designed, the hydrodynamic ramp 50 serves a hydrodynamic wedging function even in the absence of differential pressure, whenever relative rotation occurs.

One purpose of the support shoulder 57 is to support the recess 48 when differential pressure acting across the seal 2 forces additional area of the dynamic sealing surface 26 against the relatively rotatable surface 8 of the first machine component 10. The reason for providing such support is so that at least a portion of the recess 48 remains out of contact with the rotatable surface 8 of the first machine component 10. It is desirable that at least a portion of the recess 48 remains "open" (not in contact with the relatively rotatable surface 8), and can thereby provide lubricant communication to the location where the hydrodynamic ramp 50 contacts the relatively rotatable surface 8 of the first machine component 10.

The location where the hydrodynamic ramp 50 contacts the relatively rotatable surface 8 of the first machine component 10 forms a hydrodynamic inlet. When the relatively rotatable surface 8 rotates in the direction of relative rotation 46 with respect to the rotary seal 2 as shown in FIG. 1B, the lubricant-wetted relatively rotatable surface 8 drags lubricant into the interfacial contact footprint at the location where the hydrodynamic ramp 50 contacts the relatively rotatable surface 8 of the first machine component 10. This phenomenon is referred to as hydrodynamic wedging activity, and produces a film of oil between the dynamic sealing surface 26 and the relatively rotatable surface 8 of the first machine, component 10. In other words, the rotary seal 2 hydroplanes on a film of oil.

This hydrodynamic wedging activity is facilitated by the fact that the hydrodynamic ramp 50 has a very gradual convergence with the relatively rotatable surface 8 of the first machine component 10 in the circumferential direction. This hydrodynamic wedging activity is represented schematically by the lubricant migration arrow 84 (FIG. 1B), however, it is to be understood that this wedging activity occurs not just at one line of action, but occurs across much or all of the width where the hydrodynamic ramp 50 converges with the relatively rotatable surface 8.

The hydroplaning activity that occurs during relative rotation minimizes or prevents the typical dry rubbing wear and high friction associated with conventional non-hydrodynamic packing elements, prolonging the useful life of the rotary seal 2 and the life of the mating relatively rotatable surface 8 of the first machine component 10, and making higher speed, and differential pressure, practical.

As described previously, when the above-described relative rotation is occurring, the interfacial contact footprint becomes a dynamic interface, also known as a "dynamic sealing interface." During relative rotation, a net hydrodynamic pumping related leakage of the lubricant 44 preferably occurs as lubricant 44 is transferred across the dynamic sealing interface and into the contained media 40.

When all or nearly all of the dynamic sealing surface 26 is in contact with the relatively rotatable surface 8 of the first machine component 10, the portion of the rotary seal 2 that experiences the most stress is at or near the lubricant end transition 60, which is the transition between the dynamic sealing surface 26 and the low pressure end 30. The lubricant end transition 60 often takes the form of a corner, as shown, and if desired, this corner may be slightly rounded, as shown. The material near the lubricant end transition 60 experiences conditions that in the prior art cause significant wear. The hydrodynamic ramp 50, being circumferentially in line with the dynamic interface near the lubricant end transition 60, feeds lubricant 44 directly into that critical location. This causes that critical location (and the rotary seal 2 as a whole) to run much cooler than prior art packing. This cooler operation increases the extrusion resistance of the rotary seal 2 at the critical location near the lubricant end transition 60 by increasing the modulus of elasticity of the rotary seal 2 near the lubricant end transition 60 (and near the lubricant passage 42 of FIG. 1A). The film of lubricant 44 within the dynamic interface dramatically reduces wear of the dynamic sealing surface 26, compared to prior art packing, especially in the critical location near the lubricant end transition 60.

Along at least part of the location where the support shoulder 57 contacts the relatively rotatable surface 8 of the first machine component 10, a zone of elevated interfacial contact pressure occurs within the interfacial contact footprint. Preferably, at least part of this zone of interfacial contact pressure is skewed with respect to the direction of relative rotation 46, and therefore during relative rotation, the zone of interfacial contact pressure diverts part of the film of lubricant 44 toward and past the exclusion edge 32, and into the contained media 40. The skewed zone of interfacial contact pressure created by the support shoulder 57 serves to flush contaminant matter from the dynamic interface, and thereby helps to minimize wear of the dynamic sealing surface 26.

Referring now to FIG. 1C, the rotary seal 2 is illustrated in its installed condition, in the presence of differential pressure that is the result of the pressure of the contained media 40 being greater than the pressure of the lubricant 44. The pressure of the contained media 40 forces much or all of the low pressure end 30 of the rotary seal 2 into supporting contact with the first groove wall 12 and forces the static sealing rim 6 into firmer contact with the second machine component 18. Thus, the rotary seal 2 is supported against the pressure of the contained media 40 by the first groove wall 12, and preferably the low pressure end portion 30B is supported by the first wall part 12B.

The pressure of the contained media 40 also imposes force on the at least one force receiving surface 28, which causes the contact footprint width to increase; i.e., the footprint spreads. It also causes the sealing contact pressure between the dynamic sealing surface 26 and the relatively rotatable surface 8 to increase. Because of the recess 48, the contact footprint width 38 is smaller at some locations than others. In FIG. 1C, 38A represents a location of smaller footprint width, and 38B represents a location of comparatively greater footprint width. Thus, the footprint has a wavy lubricant side edge.

The recess flank 52 serves to prop at least part of the recess 48 open, so that not all of the hydrodynamic ramp 50 is in contact with the relatively rotatable surface 8, and so that at least some portion of the recess 48 remains "open" (i.e., not in contact with the relatively rotatable surface 8). The recess support corner 49 also preferably helps to keep the recess 48 open. The first recess end 54 (FIGS. 1B and 1D) also preferably helps to keep the recess 48 open. It is to be understood that as differential pressure increases, the recess support corner 49 and part of the left hand side of the hydrodynamic ramp 50 near the lubricant passage 42 might be deformed into contact with the relatively rotatable surface 8. Whether the recess support corner 49 receives its support from the first groove wall 12 or from the relatively rotatable surface 8, the support helps to keep at least the portion of the recess 48 near the recess flank 52 open. This is true even if part of the left hand side of the hydrodynamic ramp 50 near the lubricant passage 42 might be deformed into contact with the relatively rotatable surface 8, because the open part of the recess 48 extends more or less circumferentially back to the lubricant passage 42 and provides communication for the lubricant 44 that is being hydrodynamically wedged into the dynamic sealing interface at the location where the hydrodynamic ramp 50 converges with the relatively rotatable surface 8 in the generally circumferential direction.

To reiterate, if part of the left-hand side of the recess 48 is collapsed against the relatively rotatable surface 8, the open part of the recess 48 is still exposed to the extrusion gap bore 43 and the lubricant 44 and the open part of the recess 48 can serve as an open passage (i.e., a communication path) for supplying the lubricant 44 to the hydrodynamic inlet that is formed by the hydrodynamic ramp 50 converging generally circumferentially into contact with the relatively rotatable surface 8. Since the inlet consumes lubricant 44 and pumps a film of lubricant 44 toward and past the exclusion edge 32, it is critical that at least part of the recess 48 be propped open and can thereby perform its intended lubricant passageway function. Some features of this invention, such as the recess flank 52, the recess support corner 49, and the first recess end 54, their proximity to each other, and the shape of the recess 48, cooperate together with the first and second machine components 10 and 18 to allow the recess 48 to remain open despite the actions of high differential pressure, and to perform its intended functions.

With regard to FIG. 1C, it should be appreciated that even if the pressure of the contained media 40 causes the left hand part of the hydrodynamic ramp 50 to contact the relatively rotatable surface 8, the right hand part of the hydrodynamic ramp 50 will remain out of contact with the relatively rotatable surface 8 as a result of the propping effect of the recess flank 52. Thus, at least a portion of the recess 48 remains "open" near and along the recess flank 52, and opens into the lubricant passage 42 created by the clearance between the extrusion gap bore 43 of the first machine component 10 and the second machine component 18, and serves as an open communication passage for the lubricant 44, allowing the lubricant 44 to reach the hydrodynamic inlet location that is formed by the hydrodynamic ramp 50 converging into contact with the relatively rotatable surface 8 in the generally circumferential direction.

Because the pressure of the contained media 40 is greater than the pressure of the lubricant 44, the contained media 40 produces a force on the force receiving surface 28 that causes the interfacial contact pressure near the recess flank 52 to be locally elevated. Since at least part of the recess flank 52 is preferably skewed relative to the direction of relative rotation between the relatively rotatable surface 8 and the dynamic sealing lip 4, at least part of the elevated zone of interfacial contact pressure near the recess flank 52 is also preferably skewed relative to the direction of relative rotation 46, thereby encouraging the lubricant film within the sealing interface to migrate toward and past the exclusion edge 32 in response to relative rotation between the relatively rotatable surface 8 and the dynamic sealing lip 4. The direction of relative rotation 46 is normal to the plane of the cross-section; in other words it is normal to the FIG. 1A image.

A principal advantage of the preferred embodiment of the present invention is that the recess flank 52, the recess support corner 49, (and, if desired, the wall-like configuration of the first recess end 54 illustrated in FIGS. 1B and 1D) supports the hydrodynamic ramp 50 from being flattened completely against the relatively rotatable surface 8, thereby preserving an efficient, gently converging hydrodynamic inlet established between the hydrodynamic ramp 50 and the relatively rotatable surface 8 for maintaining efficient hydrodynamic film lubrication of the dynamic sealing surface 26. This makes the rotary seal 2 operate much cooler than comparable non-hydrodynamic packing. Therefore, the rotary seal 2 retains a relatively high modulus of elasticity near the lubricant passage 42 for optimum extrusion resistance, and has less wear compared to conventional non-hydrodynamic packing.

FIG. 2

Referring now to FIG. 2, an alternate embodiment of the ring-like, generally circular rotary seal of the present invention is illustrated generally at 2 in its installed condition, in the absence of differential pressure. It is to be understood that features throughout this specification that are represented by like numbers have the same function in the various embodiments of the present invention. The second groove wall 14, peripheral wall 16, contact footprint width 38, contained media 40, media passage 41, lubricant passage 42, extrusion gap bore 43, lubricant 44, recess 48, recess support corner 49, hydrodynamic ramp 50, recess flank 52, and lubricant end transition 60 are labeled in FIG. 2 for orientation purposes.

In the embodiment of FIG. 2, the rotary seal 2 is a ring that includes a dynamic sealing lip 4 and a static sealing rim 6 that are preferably integral features of the rotary seal 2. The dynamic sealing lip 4 is adapted for sealing against a relatively rotatable surface 8 of a first machine component 10.

The static sealing rim 6 is adapted for sealing with respect to the second machine component 18 by establishing sealing contact pressure with respect to the second machine component 18 achieved by having the static sealing rim 6 in compressed contacting relationship with the second machine component 18. The compressed contacting relationship is established by axial clamping of the static sealing rim 6 between the first spacer ring 20 and the second spacer ring 22 of the second machine component 18.

The dynamic sealing lip 4 incorporates a dynamic sealing surface 26 for sealing contact with the relatively rotatable surface 8, includes at least one force receiving surface 28, and preferably has an exclusion edge 32 that is generally circular.

The low pressure end 30 of the rotary seal 2 generally faces, and is supported against differential pressure, by the first groove wall 12. The first groove wall 12 preferably comprises first wall part 12A and first wall part 12B, and the low pressure end 30 of the rotary seal 2 preferably comprises low pressure end portion 30A and low pressure end portion 30B.

When installed, a portion of the dynamic sealing surface 26 contacts the first machine component 10, thereby establishing a contact footprint width 38 therewith.

FIG. 3

Referring now to FIG. 3, an alternate embodiment of the ring-like, generally circular rotary seal of the present invention is illustrated generally at 2 in its installed condition, in the absence of differential pressure.

In the description of the seal of the embodiment shown in FIG. 1A, it was disclosed that the seal of the present invention may be composed of any suitable sealing material, including combinations of materials that are joined together. FIG. 3 illustrates one way of using more than one material in the construction of the rotary seal 2. In the present embodiment, the rotary seal 2 is a ring that comprises a first material 64 and a second material 66 that are joined together by any appropriate method. If desired, the second material 66 can have a higher modulus of elasticity than the first material 64. For example, the second material 66 could be a plastic material with appropriate sealing and dynamic running properties, such as (but not limited to) reinforced polytetrafluoroethylene ("PTFE") based plastic or a mixture of polyetheretherketone and polytetrafluoroethylene, and the first material 64 could be an elastomer compound, with or without fabric reinforcement. An advantage in using a higher modulus material for the second material 66 is that it makes the recess 48 more resistant to differential pressure-induced collapse.

FIG. 4

Figure 4:
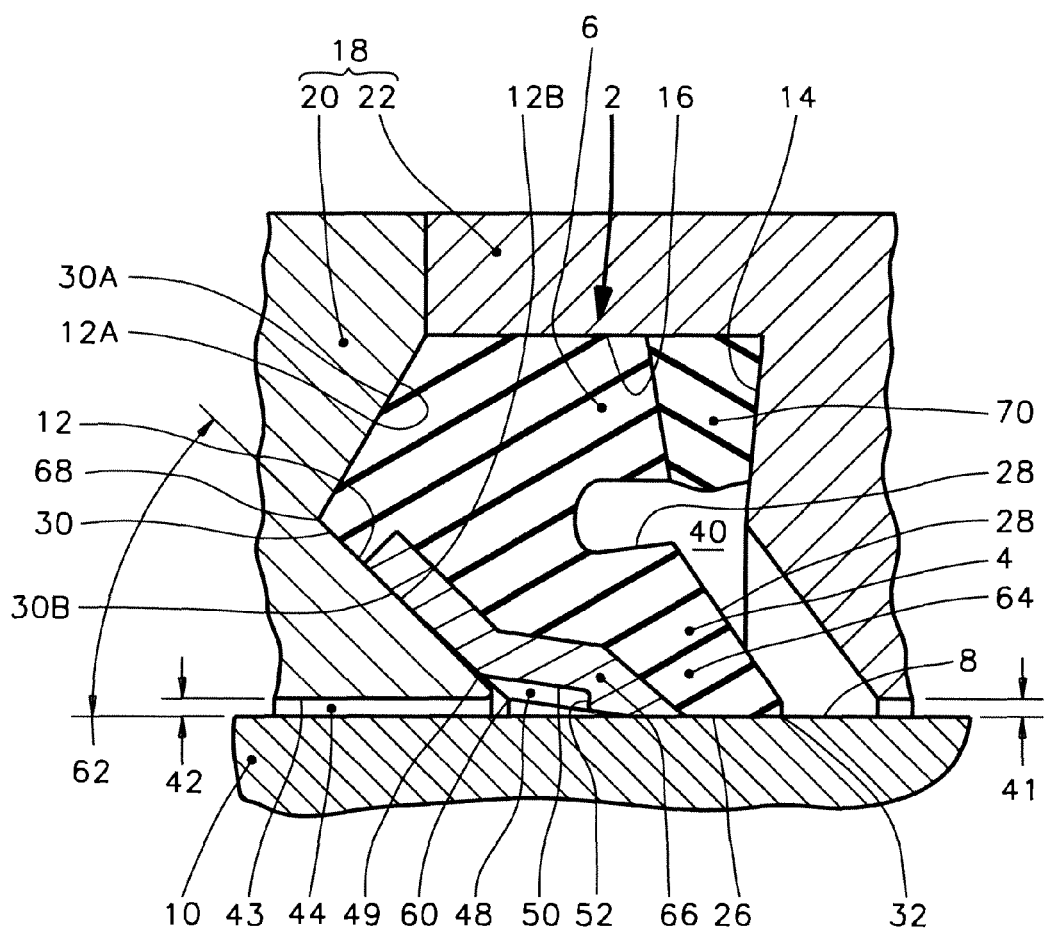

FIG. 4 illustrates another way of using more than one material in the construction of the rotary seal 2. In this embodiment, the seal comprises a first material 64 and a second material 66 that are joined together by any appropriate method. If desired, and similar to the embodiment of FIG. 3, the second material 66 can have a higher modulus of elasticity than the modulus of elasticity of the first material 64 to make the recess 48 more resistant to differential pressure-induced collapse. In the rotary seal embodiment of FIG. 4, the second material 66 is shorter than it was in the embodiment of FIG. 3, making it easier for pressure acting on the at least one force receiving surface 28 to deform more of the dynamic sealing surface 26 into contact with the relatively rotatable surface 8. If desired, a combination of the first material 64 and second material 66 may form part of the dynamic sealing surface 26.

If desired, the second material 66 need not extend to the end transition 68 between the low pressure end portion 30A and the low pressure end portion 30B, thus making it easier for the pressure of the contained media 40 to force the surface of the second material 66 into contact with the relatively rotatable surface 8 (without flattening the recess 48 against the relatively rotatable surface 8). As described previously, a lower modulus portion 70 of the static sealing rim 6 can be incorporated if desired, as is commonly done with washpipe packings.

FIG. 5

Figure 5:
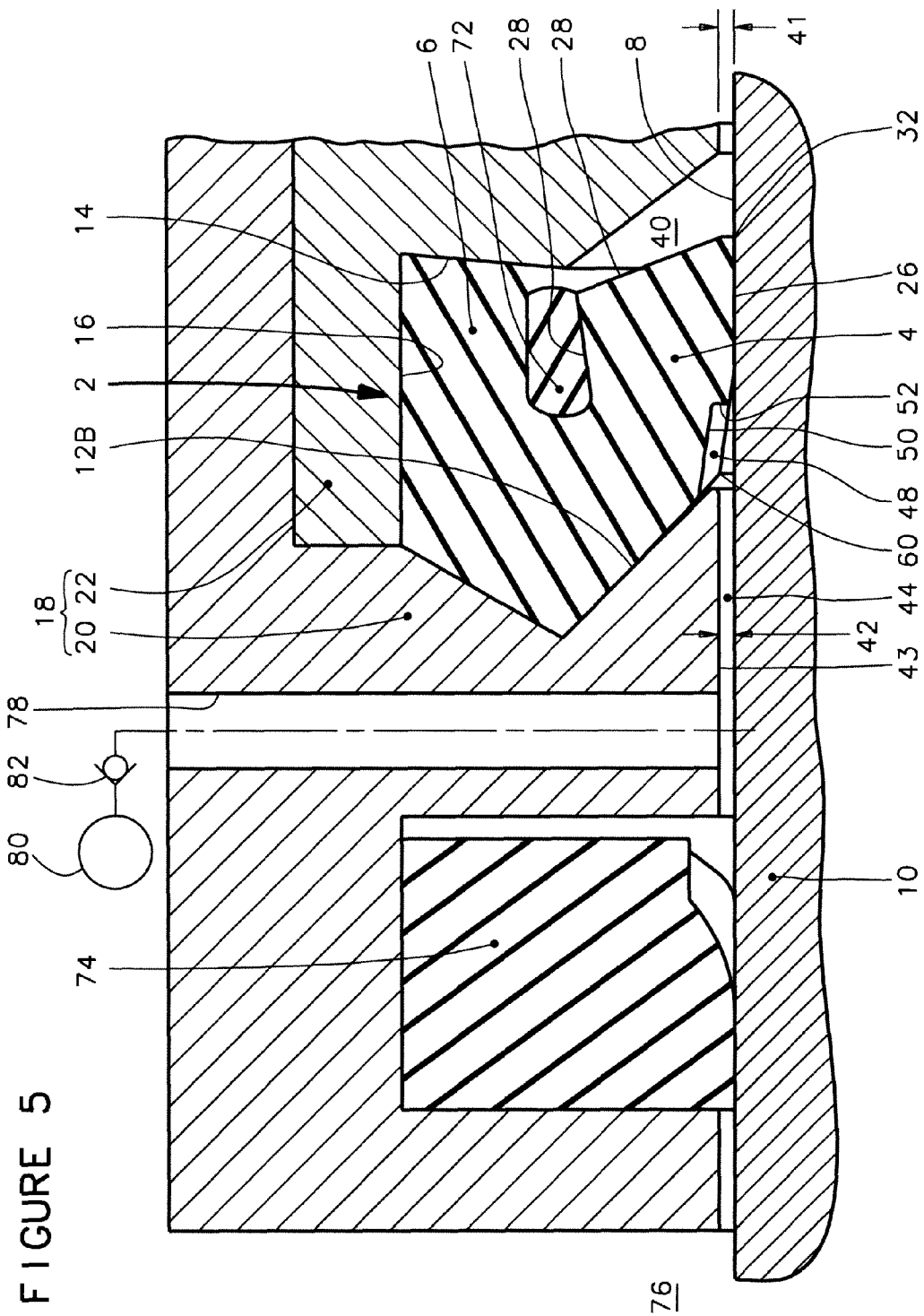
FIGS. 5 and 6 are fragmentary cross-sectional views of a ring-shaped hydrodynamic seal according to other preferred embodiments of the present invention, further showing an energizer element and with the seal arranged in tandem with another seal.
Figure 6:
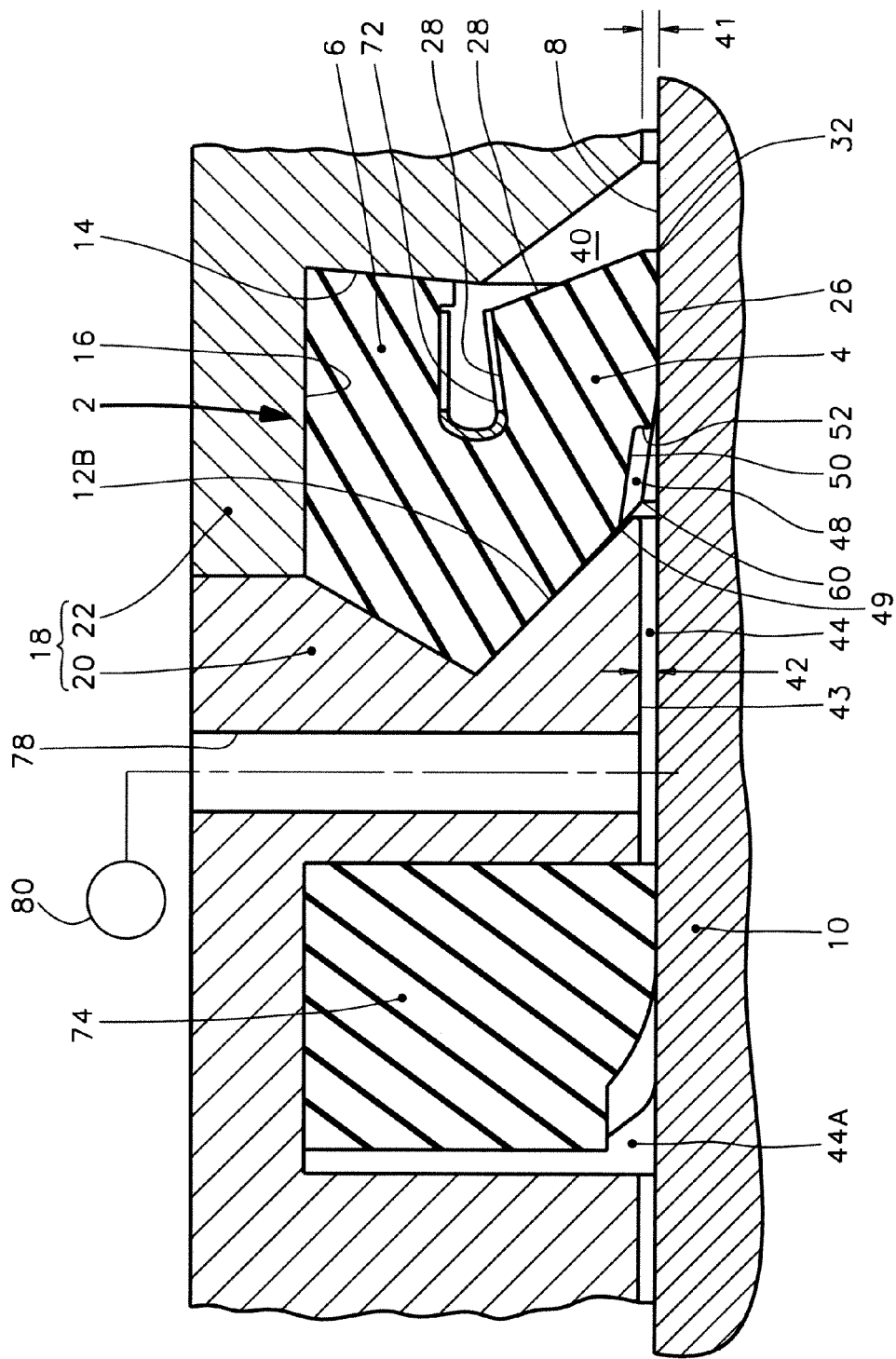

FIG. 5 shows that if desired, an energizer element 72 can be used to help to energize the dynamic sealing lip 4 of the rotary seal 2 against the relatively rotatable surface 8. The energizer element 72 may also, if desired, load the static sealing rim 6 against peripheral wall 16. Figures herein that do not illustrate an energizer element can be thought of as simplifications of the rotary seals that are shown to have an energizer element.

The energizer element 72 can take any of a number of suitable forms known in the art including, but not limited to, elastomeric rings and various forms of springs, without departing from the scope or spirit of the invention. If desired, the energizer element 72 can be located by an annular recess of any suitable form, and preferably at least part of the annular recess is defined by a force receiving surface 28. Differential pressure acting on the energizer element 72 applies force to the annular recess, including the portion of the force receiving surface 28 that is contacted by the energizer element 72.

FIG. 5 also shows that, if desired, the rotary seal 2 of the present invention may be used advantageously in an assembly that also employs a non-chevron-type prior art hydrodynamic seal 74 of the type that is configured for having high differential pressure acting from the lubricant side thereof, such as one of the seal types disclosed in commonly assigned U.S. Pat. Nos. 5,230,520, 5,738,358, 5,873,576, 6,036,192, 6,109,618, 6,120,036, 6,315,302, 6,382,634, 6,494,462, 6,685,194, 6,767,016, 7,052,020, or 7,562,878, or such as one of the seal types disclosed in commonly assigned U.S. Patent Appln. Pub. Nos. 2006/0214379, 2007/0013143, 2007/0205563, or 2009/0001671.

The advantage of using such a prior art hydrodynamic seal 74 in conjunction with the rotary seal 2 of the present invention is that the pressure of the lubricant 44 can be maintained at a value that is greater than that of a low pressure environment 76. Although the low pressure environment 76 can be any type of environment, in an oil well drilling washpipe assembly the low pressure environment 76 is typically the atmosphere, and the objective of the assembly is to prevent escape of the contained media 40 into the low pressure environment 76. If desired, the lubricant 44 can be supplied via a lubricant port 78. In other words, the rotary seal 2 of the present invention can be used in the pressure staged manner first taught in the commonly assigned U.S. Pat. No. 6,007,105 entitled "Swivel Seal Assembly," which teaches that the rotary seals of that pressure-staged invention may take any suitable form, such as hydrodynamic-type or chevron-type seals, and also discloses that the rotary seals may conveniently take the form of hydrodynamic seals such as those patented and sold by Kalsi Engineering, Inc. or any one of a number of rotary shaft seals that are suitable for the purposes intended, such as reinforced elastomeric chevron-type seals that are conventionally used in many swivels.

If desired, the lubricant 44 may be supplied through the lubricant port 78 by any suitable lubricant supply system 80, such as, but not limited to, those described in commonly assigned U.S. Pat. Nos. 6,007,105 and 6,227,547, and/or those shown in the Kalsi Seals Handbook, Revision 1. If desired, the lubricant supply system 80 can be protected against contamination (i.e., contamination due to exposure to the contained media 40 in the event of failure of the rotary seal 2) by using a check valve 82. Thermal expansion of the lubricant 44 is not an issue, because the dynamic sealing lip 4 of the rotary seal 2 will lift and vent any significant lubricant pressure into the contained media 40.

As shown, if desired, the first spacer ring 20 may form a housing that extends over the second spacer ring 22. A unique feature of FIG. 5 is the pairing of two different kinds of hydrodynamic seals, one (prior art hydrodynamic seal 74) configured for having the pressure of the lubricant 44 greater than that of the low pressure environment 76, and one (rotary seal 2) configured for having the pressure of the contained media 40 greater than that of the lubricant 44. The prior art hydrodynamic seal 74 not only retains a volume of the lubricant 44 for lubrication of the rotary seal 2, it also shares part of the differential pressure that exists between the contained media 40 and the low pressure environment 76. This allows the assembly to handle much higher differential pressure than it could if the seal that retained the lubricant for rotary seal 2 were some non-hydrodynamic seal. At the same time, the rotary seal 2 is immune to the pressure staging-related pressure lag issues that are described in IADC/SPE Paper 59107.

FIG. 6

FIG. 6 shows that, if desired, an energizer element 72 in the form of a spring can be used to help to energize the dynamic sealing lip 4 of the rotary seal 2 against the relatively rotatable surface 8. The energizer element 72 may also, if desired, load the static sealing rim 6 against the peripheral wall 16. Figures herein that do not illustrate an energizer element can be thought of as simplifications of the rotary seals that are shown to have an energizer element.

FIG. 6 shows an arrangement that is appropriate for the differential pressure issues that plague some types of downhole drilling tools. The inboard seal is a non-chevron-type prior art hydrodynamic seal 74 of the type that is not configured for having high differential pressure acting from the drilling fluid side thereof but otherwise works very well in downhole drilling applications. Some examples of such seal types are those that are disclosed in commonly assigned U.S. Pat. Nos. 5,230,520, 5,738,358, 5,873,576, 6,036,192, 6,109,618, 6,120,036, 6,315,302, 6,382,634, 6,494,462, 6,685,194, 6,767,016, 7,052,020, or 7,562,878, and the seal types disclosed in commonly assigned U.S. Patent Appln. Pub. Nos. 2006/0214379, 2007/0013143, 2007/0205563, and 2009/0001671.

The outboard seal is the rotary seal 2 of the present invention. The overall objective of the assembly is to partition a contained media 40 from a lubricant 44A within the assembly, where the pressure of the contained media 40 can occasionally be much greater than the pressure of the lubricant 44A, but for the most part the pressure of the lubricant 44A is slightly greater than (or alternately, about equal to) that of the contained media 40. In a downhole drilling tool, the contained media 40 is drilling fluid (i.e., "drilling mud"), and the lubricant 44A is typically used by the drilling tool for various purposes, such as lubricating bearings, operating hydraulic motors and hydraulic cylinders, etc. It is necessary to contain the contained media 40 so that it does not enter the drilling tool and contaminate the inner workings of the tool.

In this particular type of assembly, the lubricant 44 would typically be called a barrier lubricant, and the outboard seal, the rotary seal 2, would typically be called a "barrier seal." This "barrier seal" nomenclature is an understatement as it concerns the present invention because the rotary seal 2 fulfills much more than the traditional barrier seal function.

If desired, the initial fill of the lubricant 44 may be supplied through a lubricant port 78. If desired, the lubricant port 78 may be connected to any suitable lubricant supply system 80 while the assembly is in service, or alternately the lubricant port 78 can be plugged while the assembly is in service.

The prior art hydrodynamic seal 74 retains a volume of the lubricant 44A and its hydrodynamic pumping-related leakage enters the lubricant 44 through the lubricant passage 42. Since the pressure of the lubricant 44A is typically greater than that of the contained media 40, the prior art hydrodynamic seal 74 is used to contain the lubricant 44A, in view of the fact that the rotary seal 2 of the present invention cannot handle differential pressure acting from that direction. Also, circumstances are possible where the pressure of the lubricant 44A may temporarily be significantly higher than that of the contained media 40, and the prior art hydrodynamic seal 74 is configured to deal with such circumstances.

When the pressure of the contained media 40 is temporarily significantly greater than that of the lubricant 44, the rotary seal 2 deforms in the manner described in conjunction with previous figures herein, so that it can operate in a hydrodynamic interfacial lubrication regime.

The prior art hydrodynamic seal 74 is not well suited to service where the pressure of the contained media 40 is significantly greater than that of the lubricant, and the rotary seal 2 is not well suited to service where the pressure of the lubricant is greater than that of the contained media 40. By pairing the two types of seals in the manner illustrated in FIG. 6, the strengths of each seal type make up for the weaknesses of the other, allowing longer drilling tool life in harsh downhole drilling conditions.

It can be appreciated that the various constructions of rotary seal 2 that are illustrated herein can be used in the assemblies of FIGS. 5 and 6, without departing from the spirit or scope of the invention. It can also be appreciated that if desired, the second machine component 18 could be made of one piece, instead of being made from two separate pieces.

FIG. 7

Figure 7:
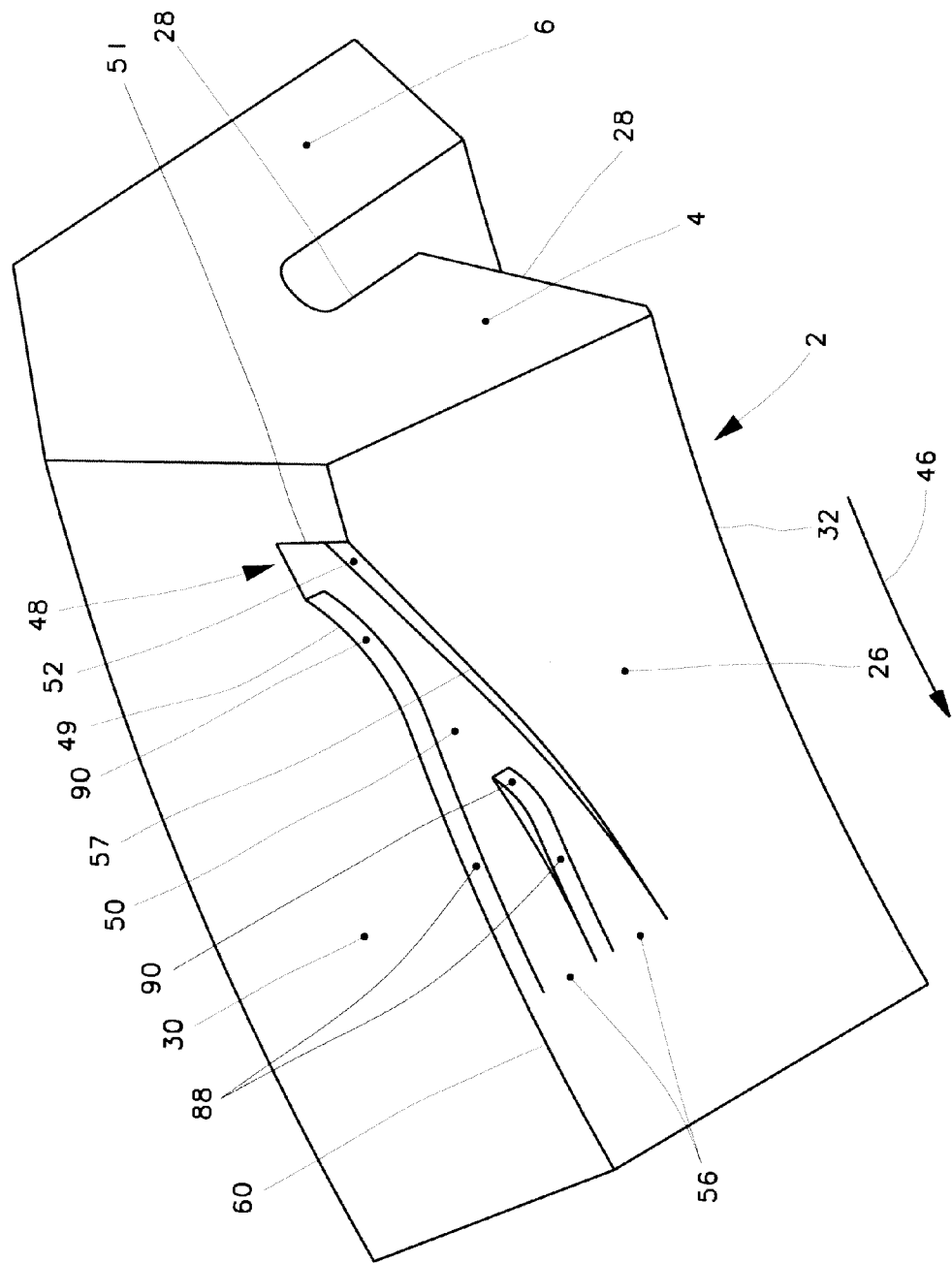
FIG. 7 is a fragmentary perspective view of a ring-shaped hydrodynamic seal according to another preferred embodiment of the present invention.

FIG. 7 shows that, if desired, the recess 48 of the rotary seal 2 can also comprise one or more support ribs 88 that preferably incorporate a hydrodynamic leading edge 90. The support ribs 88 can be generally circumferentially oriented, as shown, and serve to provide additional support against the total differential pressure-induced collapse of the recess 48. In other words, the support ribs 88 help to ensure that at least a portion of the hydrodynamic ramp 50 is not deformed into contact with the mating relatively rotatable surface, thereby preserving lubricant communication and the hydrodynamic wedging function of the hydrodynamic ramp 50. Figures herein that do not illustrate one or more support ribs 88 can be thought of as representing simplifications of the rotary seals that are shown to have one or more support ribs 88.

If desired, the novel recess 48 described in conjunction with the various embodiments of the present invention may be configured for combination with the basic prior art seal cross-sectional shapes that are shown in U.S. Pat. No. 6,334,619, in order to eliminate the wavy seal lubricant end and wavy backup ring that are described in U.S. Pat. No. 6,334,619.

In view of the foregoing it is evident that the present invention is one that is well adapted to attain all of the features hereinabove set forth, together with other objects and features which are inherent in the apparatus disclosed herein. Even though several specific hydrodynamic rotary seal and seal gland geometries are disclosed in detail herein, many other geometrical variations employing the basic principles and teachings of this invention are possible.

The foregoing disclosure and description of the invention are illustrative and explanatory thereof, and various changes in the size, shape, and materials, as well as in the details of the construction shown and described, may be made without departing from the spirit of the invention. The present embodiments are, therefore, to be considered as merely illustrative and not restrictive, the scope of the invention being indicated by the claims rather than the foregoing description, and all changes which come within the meaning and range of equivalence of the claims are therefore intended to be embraced therein.

We claim:

1. A hydrodynamic seal comprising:
an annular seal body having a circumference, said annular seal body having a dynamic sealing surface, a low pressure end surface adapted for being supported by contact with a mating groove wall, and a force receiving surface adapted to be exposed to the pressure of a contained media;
said annular seal body defining a generally circumferentially-oriented recess, said recess defined by a ramp and a flank and first and second recess ends, said ramp being located between said first and second recess ends and between said flank and said low pressure end surface, said second recess end being circumferentially spaced from said first recess end and defining a recess circumferential length, said recess having a recess depth established by a recessed location of at least a portion of said ramp relative to said dynamic sealing surface, said recess depth varying along at least part of said recess circumferential length from a location of maximum recess depth to a location of less recess depth, said recess formed between at least a portion of said low pressure end surface and at least a portion of said dynamic sealing surface, said first recess end located on said low pressure end surface and said second recess end located on said dynamic sealing surface;
at least a portion of said flank located between said dynamic sealing surface and said ramp, at least a portion of said flank forming an internal corner with at least part of said ramp, and at least a portion of said flank forming a support shoulder in the form of an external corner with said dynamic sealing surface;
at least a portion of said ramp sloping relative to said dynamic sealing surface; and
at least a portion of said flank diminishing in size along said recess circumferential length between said first and second recess ends.

2. The hydrodynamic seal of claim 1, wherein said flank is oriented substantially perpendicular to said ramp at said first recess end.

3. The hydrodynamic seal of claim 1, wherein said ramp is recessed relative to said dynamic sealing surface at said first recess end.

4. The hydrodynamic seal of claim 1, wherein said flank merges smoothly into said dynamic sealing surface at said second recess end.

5. The hydrodynamic seal of claim 1, wherein said recess has a maximum recess width at said second recess end, and said dynamic sealing surface has a surface width that abruptly changes from a minimum surface width to a maximum surface width at said second recess end.

6. The hydrodynamic seal of claim 1, wherein said flank is substantially perpendicular to said dynamic sealing surface adjacent said first recess end.

7. The hydrodynamic seal of claim 1, wherein said recess has a maximum depth at said first recess end.

8. The hydrodynamic seal of claim 1, wherein said recess has a width and said width of said recess is greatest at said second recess end and narrower at said first recess end.

9. The hydrodynamic seal of claim 1, wherein said first recess end is a closed end which ends said recess abruptly.

10. The hydrodynamic seal of claim 1, wherein an intersection between said ramp and said low pressure end surface establishes at least one recess support corner being an external corner.

11. The hydrodynamic seal of claim 1, wherein said low pressure end surface is generally V-shaped when said annular seal body is viewed in cross-section.

12. A hydrodynamic rotary seal comprising:
an annular seal body having a circumference, a low pressure end surface and including a static sealing rim and a dynamic sealing lip;
said dynamic sealing lip defining a dynamic sealing surface, a generally circular exclusion edge, and a force receiving surface, said dynamic sealing surface located between said low pressure end surface and said generally circular exclusion edge and extending to said generally circular exclusion edge;
said annular seal body defining a generally circumferentially-oriented recess having a first recess end located on said low pressure end surface and a second recess end located on said dynamic sealing surface, said first recess end separated from said second recess end by a recess circumferential length, said recess having a ramp and a flank;
said ramp sloping along said circumference from a position recessed below said dynamic sealing surface at said first recess end to a position level with said dynamic sealing surface at said second recess end;
said flank diminishing in size along at least a portion of said recess circumferential length between said first and second recess ends;
said flank being separated from said generally circular exclusion edge by a flank separating distance, said flank separating distance diminishing along at least a portion of said recess circumferential length between said first and second recess ends and being larger at said first recess end compared to midway between said first and second recess ends, and
said ramp being separated from said generally circular exclusion edge by a ramp separating distance, said ramp separating distance diminishing along at least a portion of said recess circumferential length between said first and second recess ends and being larger at said first recess end compared to midway between said first and second recess ends.

13. A hydrodynamic sealing assembly comprising:
a first machine component having a relatively rotatable surface;
a second machine component defining at least a portion of a seal groove and defining a radially inwardly facing extrusion gap bore surrounding and facing a portion of said relatively rotatable surface and establishing an extrusion gap therewith; and
a rotary seal in sealing engagement with said relatively rotatable surface and said seal groove, said rotary seal comprising:
an annular seal body having a circumference, a low pressure end surface, and including a static sealing rim and a dynamic sealing lip;
said dynamic sealing lip defining a dynamic sealing surface, an abrupt exclusion edge of generally circular form, and a force receiving surface,
a generally circumferentially-oriented recess having a first recess end and a second recess end that is circumferentially spaced from said first recess end, said recess having a ramp and an adjacent flank and a recess circumferential length between said first and second recess ends, said ramp sloping along at least part of said recess circumferential length from a position recessed below said dynamic sealing surface at said first recess end until merging circumferentially with said dynamic sealing surface at said second recess end, said first recess end located on said low pressure end surface and said second recess end located on said dynamic sealing surface;
an intersection between said dynamic sealing surface and at least part of said flank forming a support shoulder in the form of an external corner; and
said flank diminishing in size along at least part of said recess circumferential length and becoming smaller toward said second recess end;
said ramp having a ramp surface width that varies along at least a portion of said recess circumferential length, said ramp surface width being smaller at said first recess end compared to said ramp surface width midway between said first and second recess ends; and
said support shoulder being farther from said abrupt exclusion edge at said first recess end compared to midway between said first and second recess ends.

14. An interference type hydrodynamic seal for location within a machine component seal groove for dynamic sealing engagement with a relatively rotatable surface and for serving as a partition between a lubricant and a contained media, and for providing a film of lubricant between the hydrodynamic seal and the relatively rotatable surface during relative rotation with the contained media at a higher pressure than the lubricant, the hydrodynamic seal comprising:
an annular seal body defining a static sealing rim adapted to form a static sealing interface with the machine component seal groove;
said annular seal body defining a dynamic sealing lip having a dynamic sealing surface for establishing a dynamic sealing interface with the relatively rotatable surface, said dynamic sealing lip defining a force receiving surface for exposure to the contained media and an abrupt exclusion edge formed between said force receiving surface and said dynamic sealing surface;
said annular seal body defining a low pressure end surface adapted for supporting contact with the machine component seal groove, said low pressure end surface intersecting said dynamic sealing surface at a lubricant end transition;
a hydrodynamic inlet geometry for exposure to the lubricant and for hydrodynamically wedging a film of lubricant into the dynamic sealing interface during relative rotation between said dynamic sealing surface and the relatively rotatable surface, the hydrodynamic inlet geometry being formed by a recess cutting into a portion of said low pressure end surface and said dynamic sealing surface, said recess having a circumferential length between first and second circumferentially separated recess ends, said first circumferentially separated recess end located on said low pressure end surface and said second circumferentially separated recess end located on said dynamic sealing surface;
said recess comprising a ramp and a flank, an intersection between said ramp and said low pressure end surface establishing an external recess support corner, an intersection between said flank and said dynamic sealing surface forming a support shoulder in the form of an external corner;
at least a portion of said ramp having a gradually decreasing depth along at least part of said recess circumferential length; and
at least a portion of said support shoulder being skewed with respect to said abrupt exclusion edge.

15. The hydrodynamic seal of claim 14, wherein said flank diminishing in size in a generally circumferential direction from a position adjacent said low pressure end surface toward said exclusion edge and said ramp sloping in a radial direction from a position remote from said dynamic sealing surface at said first recess end to said second recess end.

16. The hydrodynamic seal of claim 15, wherein said dynamic sealing surface has a surface width that varies, said surface width being a maximum surface width at said first recess end and said surface width abruptly changing from a minimum surface width to a maximum surface width at said second recess end.

17. The hydrodynamic seal of claim 15, wherein at least part of said flank is skewed with respect to said abrupt exclusion edge.

18. A hydrodynamic sealing assembly comprising:
a first machine component having a relatively rotatable surface;
a second machine component defining at least a portion of a seal groove and defining a radially inwardly facing extrusion gap bore surrounding and facing a portion of said relatively rotatable surface and establishing an extrusion gap therewith; and
a rotary seal in sealing engagement with said first and second machine components, said rotary seal comprising:
an annular seal body including a low pressure end surface within said seal groove, a static sealing rim and a dynamic sealing lip, said static sealing rim forming a static sealing interface with said second machine component;
said dynamic sealing lip defining a dynamic sealing surface having an axial surface width and establishing a dynamic sealing interface with said relatively rotatable surface, and said dynamic sealing lip defining a force receiving surface adapted for exposure to a pressurized media, said dynamic sealing surface joining said force receiving surface at an abrupt exclusion edge;
at least one generally circumferentially-oriented recess having a first recess end and a second recess end that is spaced from said first recess end by a circumferential length, said recess defining a hydrodynamic ramp and a flank, said flank diminishing in size between said first and second recess ends and said hydrodynamic ramp sloping from a position recessed below said dynamic sealing surface at said first recess end to a position level with said dynamic sealing surface at said second recess end, wherein said recess is exposed to and contains a lubricant, said first recess end located on said low pressure end surface and said second recess end located on said dynamic sealing surface; and
said axial surface width of said dynamic sealing surface varying along said circumferential length of said recess, said axial surface width at said first recess end being greater than said axial surface width midway along said circumferential length of said recess.

19. The sealing assembly of claim 18, wherein said seal groove is defined by a first groove wall, a second groove wall and a peripheral wall, said peripheral wall positioned in spaced relation to said relatively rotatable surface,
wherein said low pressure end surface of said rotary seal generally faces said first groove wall and is in supported contact therewith.

20. The sealing assembly of claim 18, wherein said recess near said first recess end forms a local opening in said low pressure end surface.

21. The sealing assembly of claim 18, wherein said flank approaches closest to said exclusion edge at said second recess end.

22. The sealing assembly of claim 18, wherein said flank is the most distant from said exclusion edge at said first recess end.

23. The sealing assembly of claim 18, wherein an intersection between said flank and said dynamic sealing surface forms an external support shoulder.

24. The sealing assembly of claim 18, wherein said dynamic sealing surface has a width that varies locally along said recess circumferential length, said width of said dynamic sealing surface being maximum at said first recess end.

25. The hydrodynamic seal of claim 10, wherein said recess support corner is rounded.

26. The hydrodynamic seal of claim 1, wherein at least a portion of said recess cuts into said dynamic sealing surface.

27. The hydrodynamic seal of claim 1, wherein at least a portion of said recess cuts into said low pressure end surface.

28. The hydrodynamic seal of claim 1, wherein at least a portion of said low pressure end surface adjoins at least a portion of said dynamic sealing surface and forms an external corner, and said recess near said first recess end forms a local opening in said low pressure end surface.

29. The hydrodynamic seal of claim 1, wherein said flank diminishing in size between said low pressure end surface and said second recess end.

30. The hydrodynamic seal of claim 1, wherein said dynamic sealing surface defines a generally circular exclusion edge adjacent said force receiving surface and said flank approaches closest to said exclusion edge at said second recess end.

31. The hydrodynamic seal of claim 1, wherein an intersection between said ramp and said low pressure end surface forms an external recess support corner, and said flank approaches closest to said recess support corner at said first recess end.

32. The hydrodynamic seal of claim 1, wherein said dynamic sealing surface defines a generally circular exclusion edge adjacent said force receiving surface and said flank is most distant from said exclusion edge at said first recess end.

33. The hydrodynamic seal of claim 1, wherein the size of said flank tapers to zero at said second recess end.

34. The hydrodynamic rotary seal of claim 12, wherein said flank approaching closest to said generally circular exclusion edge at said second recess end.

35. The hydrodynamic rotary seal of claim 12, wherein an intersection between said ramp and said low pressure end surface forms an external recess support corner, and said flank approaches closest to said external recess support corner at said first recess end.

36. The hydrodynamic rotary seal of claim 12, wherein said flank is most distant from said generally circular exclusion edge at said first recess end.

37. The hydrodynamic rotary seal of claim 12, wherein said first recess end cuts into said dynamic sealing surface and into said low pressure end surface.

38. The hydrodynamic rotary seal of claim 12, wherein said first recess end is a closed end terminating said recess abruptly.

39. The hydrodynamic rotary seal of claim 12, wherein said dynamic sealing surface has a width that varies locally along said recess circumferential length, said width of said dynamic sealing surface being maximum at said first recess end.

40. The hydrodynamic rotary seal of claim 12, wherein an intersection between said ramp and said flank forms an internal corner.

41. The hydrodynamic sealing assembly of claim 13, wherein an intersection between said low pressure end surface and at least part of said ramp forming an external recess support corner.

42. The hydrodynamic sealing assembly of claim 41, wherein said flank is the closest to said recess support corner at said first recess end.

43. The hydrodynamic sealing assembly of claim 13, wherein said flank approaching closest to said abrupt exclusion edge at said second recess end.

44. The hydrodynamic sealing assembly of claim 13, wherein said flank is the most distant from said abrupt exclusion edge at said first recess end.

45. The hydrodynamic sealing assembly of claim 13, wherein said dynamic sealing surface has a width that varies locally along at least part of said recess circumferential length, said width of said dynamic sealing surface being maximum at said first recess end.

46. The hydrodynamic sealing assembly of claim 13, wherein an intersection between said ramp and said flank forms an internal corner.

47. The hydrodynamic seal of claim 14, wherein said flank diminishing in size along at least part of said recess circumferential length between said first and second recess ends, said flank size being largest at said first recess end.

48. The hydrodynamic seal of claim 14, wherein said flank forms a ledge between said dynamic sealing surface and at least a portion of said ramp.

49. The hydrodynamic seal of claim 14, wherein said flank is closest to said exclusion edge at said second recess end.

50. The hydrodynamic seal of claim 14, wherein said flank is the most distant from said exclusion edge at said first recess end.

51. The hydrodynamic seal of claim 14, wherein said flank is the closest to said recess support corner at said first recess end.

52. The hydrodynamic seal of claim 14, wherein at least a portion of said flank is substantially perpendicular to said ramp.

53. The hydrodynamic seal of claim 14, wherein said first recess end is a closed end.

54. The hydrodynamic seal of claim 14, wherein said recess cutting into a portion of said low pressure end surface.

55. The hydrodynamic seal of claim 14, wherein an intersection between said ramp and said flank forms an internal corner.

56. A rotary seal for sealing engagement with a relatively rotatable surface and for serving as a partition between a lubricant and a pressurized fluid, the rotary seal comprising:
an annular body including a static sealing rim in generally opposed relation to a dynamic sealing lip, and a low pressure end surface;
said dynamic sealing lip including a force receiving surface adapted for exposure to the pressurized fluid, at least one dynamic sealing surface located between a generally circular exclusion edge and said low pressure end surface;
a generally circumferentially-oriented recess having a first recess end and a second recess end, said second recess end being separated from said first recess end by a circumferential length, said first recess end located on said low pressure end surface and said second recess end located on said at least one dynamic sealing surface;
said recess comprising a ramp and a flank, at least a portion of said flank forming a ledge between a portion of said at least one dynamic sealing surface and at least a portion of said ramp, a juncture between said ramp and said flank forming an inside corner, and a juncture between said flank and said at least one dynamic sealing surface forming a support shoulder in the form of an external corner, at least a portion of said support shoulder being skewed with respect to said exclusion edge;
at least a portion of said ramp being recessed below said at least one dynamic sealing surface and having depth relative to said at least one dynamic sealing surface, said depth gradually diminishing along at least part of said recess circumferential length between said first and second recess ends, said depth becoming smaller toward said second recess end, said at least a portion of said ramp being sloped relative to said at least one dynamic sealing surface;
said flank diminishing in size along at least part of said recess circumferential length between said first and second recess ends, becoming smaller toward said second recess end, and at least a portion of said flank being skewed with respect to said generally circular exclusion edge;
at least a portion of said inside corner at said juncture between said flank and said ramp being separated from said generally circular exclusion edge by a first separating distance that varies along at least part of said recess circumferential length, said first separating distance gradually diminishing along at least part of said recess circumferential length, said first separating distance at said first recess end being greater than said first separating distance midway along said circumferential length; and
at least a portion of said support shoulder at said juncture between said flank and said at least one dynamic sealing surface being separated from said generally circular exclusion edge by a second separating distance that varies along at least part of said recess circumferential length, said second separating distance gradually diminishing along at least part of said recess circumferential length, said second separating distance at said first recess end being greater than said second separating distance midway along said recess circumferential length.

57. The rotary seal of claim 56, wherein said at least one dynamic sealing surface having a surface width that varies locally along at least part of said recess circumferential length between said first and second recess ends, said surface width becoming narrower toward said second recess end.

58. The rotary seal of claim 56, wherein said force receiving surface including an annular groove interposed between said static sealing rim and said dynamic sealing lip.

59. The rotary seal of claim 56, wherein said first recess end forming a local opening in said low pressure end surface.

60. The rotary seal of claim 56, wherein said ramp being level with said at least one dynamic sealing surface at said second recess end.

61. The rotary seal of claim 56, wherein an intersection between said low pressure end surface and at least a portion said ramp forming an external recess support corner, and said flank approaching closest to said recess support corner at said first recess end.

62. The rotary seal of claim 56, wherein said depth being zero at said second recess end.

63. The rotary seal of claim 56, wherein said flank being closer to said generally circular exclusion edge at said second recess end, and more distant to said generally circular exclusion edge at said first recess end.

64. A packing ring for sealing engagement with a relatively rotatable surface and for serving as a partition between a lubricant and a pressurized fluid, the packing ring comprising:
- an annular body including a static sealing rim in generally opposed relation to a dynamic sealing lip, and a generally V-shaped low pressure end surface adapted for being supported by a V-shaped groove wall;
- said dynamic sealing lip including a tapered dynamic sealing surface having a generally circular exclusion edge and a force receiving surface adapted for exposure to the pressurized fluid;
- a generally circumferentially-oriented recess having a first recess end and a second recess end, said second recess end being separated from said first recess end by a circumferential length, said first recess end located on said generally V-shaped low pressure end surface and said second recess end located on said dynamic sealing surface;
- said recess comprising a ramp and a flank, at least a portion of said flank forming a ledge between a portion of said dynamic sealing surface and at least a portion of said ramp, a juncture between said ramp and said flank forming an inside corner, and a juncture between said flank and said dynamic sealing surface forming a support shoulder in the form of an external corner, at least a portion of said support shoulder being skewed with respect to said exclusion edge, said first recess end forming a local opening in said low pressure end surface, at least a portion of said recess being located between said low pressure end surface and said dynamic sealing surface;
- at least a portion of said ramp being recessed below said dynamic sealing surface and having depth relative to said dynamic sealing surface, said depth gradually diminishing along at least part of said circumferential length between said first and second recess ends, said depth becoming smaller toward said second recess end, said at least a portion of said ramp being sloped relative to said dynamic sealing surface;
- said flank diminishing in size along at least part of said circumferential length between said first and second recess ends, becoming smaller toward said second recess end, at least a portion of said flank being skewed with respect to said exclusion edge;
- said dynamic sealing surface having a surface width that varies locally along at least part of said circumferential length between said first and second recess ends, said surface width becoming narrower toward said second recess end;
- said force receiving surface including an annular groove interposed between said static sealing rim and said dynamic sealing lip; and
- an intersection between said low pressure end surface and at least a portion said ramp forming an external recess support corner, and said flank approaching closest to said external recess support corner at said first recess end.

65. The packing ring of claim 64, wherein at least a portion of said dynamic sealing surface extending from said generally circular exclusion edge to said low pressure end surface.

66. The packing ring of claim 64, wherein said first recess end forms an external corner with said low pressure end surface.

67. The rotary seal of claim 56, wherein at least a portion of said at least one dynamic sealing surface extending from said generally circular exclusion edge to said low pressure end surface.

68. The rotary seal of claim 56, wherein said first recess end forms an external recess support corner with said low pressure end surface.

69. The hydrodynamic sealing assembly of claim 18, wherein at least a portion of said hydrodynamic ramp is separated from said relatively rotatable surface at said extrusion gap.

70. The hydrodynamic sealing assembly of claim 18, wherein at least a portion of said recess opening into said extrusion gap.

71. The hydrodynamic sealing assembly of claim 18, wherein said seal groove defines a first groove wall, and at least a portion of said hydrodynamic ramp terminates at said first groove wall.

72. The hydrodynamic sealing assembly of claim 18, wherein said seal groove defines a first groove wall, and at least a portion of said recess opens onto said first groove wall.

73. The hydrodynamic sealing assembly of claim 18, wherein said seal groove defines a sloping first groove wall, and at least a portion of said hydrodynamic ramp is located radially outward of and faces at least a portion of said sloping first groove wall, said at least a portion of said sloping first groove wall being located between said at least a portion of said hydrodynamic ramp and said relatively rotatable surface.

74. The hydrodynamic sealing assembly of claim 18, wherein at least a portion of said hydrodynamic ramp is located radially outward of said extrusion gap bore, said extrusion gap bore being located in intermediate relation with respect to said at least a portion of said hydrodynamic ramp and said relatively rotatable surface.

75. The hydrodynamic sealing assembly of claim 18, wherein at least a portion of said recess being adjacent to said extrusion gap.

76. The hydrodynamic sealing assembly of claim 18, wherein said seal groove defines a first groove wall, and at least a portion of said hydrodynamic ramp is adjacent to said first groove wall.

77. The hydrodynamic sealing assembly of claim 18, wherein at least a portion of said recess being exposed to said extrusion gap.

78. The hydrodynamic sealing assembly of claim 18, wherein said seal groove defines a first groove wall and said first recess end forming an external recess support corner with said low pressure end surface, at least a portion of said external recess support corner contacting and being supported by said first groove wall.

79. The hydrodynamic sealing assembly of claim 18, wherein a second edge of said dynamic sealing surface is adjacent to said extrusion gap, and a portion of said recess is circumferentially aligned with said second edge of said dynamic sealing surface.

80. The hydrodynamic sealing assembly of claim 18, wherein a second edge of said dynamic sealing surface is formed by an intersection between said dynamic sealing surface and said low pressure end surface, and at least a portion of said recess is circumferentially aligned with said second edge of said dynamic sealing surface.

81. The hydrodynamic sealing assembly of claim 18, wherein said dynamic sealing lip partitions the pressurized media from the lubricant, the pressurized media having a media pressure and the lubricant having a lubricant pressure, a portion of said dynamic sealing surface being circumferentially aligned with said recess, said portion of said dynamic sealing surface being separated from said relatively rotatable surface when the lubricant pressure and the media pressure are equal, and said portion of said dynamic sealing surface contacting said relatively rotatable surface when the media pressure is greater than the lubricant pressure.

82. The interference type hydrodynamic seal of claim 14, wherein at least a portion of said dynamic sealing surface extending from said abrupt exclusion edge to said low pressure end surface.

83. The interference type hydrodynamic seal of claim 14, wherein at least a portion of said ramp forms a substantially straight line when said annular seal body is viewed in cross-section.

84. The interference type hydrodynamic seal of claim 14, wherein said annular seal body has an axis, and at least a portion of said ramp is a substantially straight line that is substantially parallel to said axis when said annular seal body is viewed in cross-section.

85. The interference type hydrodynamic seal of claim 14, wherein said recess is bounded by said dynamic sealing surface and said low pressure end surface.

86. The interference type hydrodynamic seal of claim 14, wherein said at least a portion of said recess is recessed relative to said low pressure end surface.

87. The interference type hydrodynamic seal of claim 14, wherein at least a portion of said ramp is circumferentially aligned with at least a portion of said flank and at least a portion of said dynamic sealing surface.

88. The interference type hydrodynamic seal of claim 14, wherein a circumferential portion of said dynamic sealing surface being located in circumferential alignment with and between said ramp and said flank.

89. The interference type hydrodynamic seal of claim 14, wherein said low pressure end surface and said dynamic sealing surface intersect forming an obtuse corner;
said support shoulder formed by said flank and said dynamic sealing surface has a shoulder end at said first recess end; and
said shoulder end is located at said obtuse corner.

90. The interference type hydrodynamic seal of claim 14, wherein at least a portion of said first recess end is bordered by said low pressure end surface.

91. The interference type hydrodynamic seal of claim 14, wherein said ramp forms a step relative to said dynamic sealing surface.

92. The interference type hydrodynamic seal of claim 14, wherein said first recess end forms a recess in said low pressure end surface.

93. The interference type hydrodynamic seal of claim 14, wherein said low pressure end surface has an inner surface edge and an outer surface edge, at least a portion of said inner surface edge being located at an intersection with said dynamic sealing surface, and at least a portion of said ramp is located in intermediate relation to said inner and outer surface edges.

94. The hydrodynamic seal of claim 14, wherein said first recess end is a circumferentially facing surface bounded by and adjacent to said low pressure end surface, said ramp, and said flank.

95. The hydrodynamic seal of claim 14, wherein said low pressure end surface having inner and outer edges, a portion of said inner edge being parallel to said outer edge, and said first recess end being oriented substantially normal to said portion of said inner edge.

96. The hydrodynamic seal of claim 14, wherein said low pressure end surface having inner and outer edges, a portion of said inner edge being substantially parallel to said outer edge, at least a portion of said recess being located circumferentially in line with said portion of said inner edge.

97. The hydrodynamic seal of claim 14, wherein said recess support corner curving axially from and curving radially inward from said first recess end to said lubricant end transition at said second recess end.

98. The hydrodynamic seal of claim 14, wherein said support shoulder having a first support shoulder end at said first recess end, and said first support shoulder end being level with said lubricant end transition.

99. The hydrodynamic seal of claim 14, wherein said inside corner being a rounded inside corner that is radially spaced from said dynamic sealing surface and said support shoulder at said first recess end, said support shoulder being a rounded external corner that is radially spaced from said ramp and said inside corner at said first recess end and joining with said lubricant end transition at said first recess end, said rounded inside corner and said support shoulder merging smoothly into said dynamic sealing surface at said second recess end.

100. The hydrodynamic seal of claim 14, wherein said recess support corner is level with said low pressure end surface at said first recess end and is level with said dynamic sealing surface at said second recess end.

101. The hydrodynamic seal of claim 14, wherein said low pressure end surface has an end surface width that varies along said circumferential length of said recess.

102. The hydrodynamic seal of claim 101, wherein said end surface width gradually transitioning from a maximum end surface width at said second recess end to a minimum end surface width at said first recess end.

103. The hydrodynamic seal of claim 102, wherein said low pressure end surface abruptly transitioning from said minimum end surface width to a maximum end surface width at said first recess end.

104. The hydrodynamic seal of claim 101, wherein said end surface width transitioning from a minimum end surface width to a maximum end surface width at said first recess end.

105. The hydrodynamic seal of claim 14, wherein said lubricant end transition being formed by an intersection between said low pressure end surface and said dynamic sealing surface in the form of an obtuse outside corner, a juncture between said ramp and said flank forming an inside corner, said support shoulder joining with said lubricant end transition at said first recess end, and said inside corner being recessed relative to said low pressure end surface and relative to said dynamic sealing surface at said first recess end.

106. The hydrodynamic seal of claim 14, wherein said recess forming a notch in said low pressure end surface that is skewed with respect to said abrupt exclusion edge.

107. The interference type hydrodynamic seal of claim 55, wherein said dynamic sealing surface terminates at said abrupt exclusion edge;
at least a portion of said internal corner between said flank and said ramp being separated from said abrupt exclusion edge by a first separating distance, said first separating distance gradually diminishing along at least part of said circumferential length, said first separating distance being greatest at said first circumferentially separated end; and
at least a portion of said support shoulder being separated from said abrupt exclusion edge by a second separating distance, said second separating distance gradually diminishing along at least part of said circumferential length, said second separating distance being greatest at said first circumferentially separated end.

108. The hydrodynamic sealing assembly of claim 13, wherein said dynamic sealing surface terminates at said abrupt exclusion edge, at least a portion of said dynamic sealing surface extending from said abrupt exclusion edge to said low pressure end surface.

109. The hydrodynamic sealing assembly of claim 13, wherein said first recess end forms an external corner with said low pressure end surface.

110. The hydrodynamic sealing assembly of claim 13, wherein at least a portion of said recess opening into said extrusion gap.

111. The hydrodynamic sealing assembly of claim 13, wherein at least a portion of said recess being adjacent to said extrusion gap.

112. The hydrodynamic seal of claim 12, wherein said low pressure end surface having an end surface width including first and second locations of maximum end surface width and a location of minimum end surface width, at least part of said recess being located adjacent to said location of minimum end surface width.

113. The hydrodynamic seal of claim 12, wherein said low pressure end surface having an end surface width that varies, including first and second locations of maximum end surface width, at least part of said recess being located between said first and second locations of maximum end surface width.

114. The hydrodynamic seal of claim 12, wherein said generally circular exclusion edge being a first axial extremity of said dynamic sealing surface, said dynamic sealing surface having a second edge at a second axial extremity of said dynamic sealing surface, a portion of said second edge being parallel to said generally circular exclusion edge, and at least a portion of said recess being circumferentially aligned with said portion of said second edge.

115. The hydrodynamic seal of claim 12, wherein said generally circular exclusion edge being a first axial extremity of said dynamic sealing surface, said dynamic sealing surface having a second edge at a second axial extremity of said dynamic sealing surface, a first portion of said second edge being parallel to said generally circular exclusion edge, a second portion of said second edge being parallel to said generally circular exclusion edge and being circumferentially spaced from said first portion of said second edge, at least part of said recess being located between said first and second edge portions.

116. The hydrodynamic seal of claim 12, wherein said dynamic sealing surface has a surface width that varies, said generally circular exclusion edge being a first axial extremity of said dynamic sealing surface, said dynamic sealing surface having a second edge at a second axial extremity of said dynamic sealing surface, a first portion of said second edge being parallel to said generally circular exclusion edge at a first location of maximum surface width of said dynamic sealing surface, a second portion of said second edge being parallel to said generally circular exclusion edge at a second location of maximum surface width of said dynamic sealing surface and being circumferentially spaced from said first portion of said second edge, at least part of said recess being located between said first and second locations of maximum surface width of said dynamic sealing surface.

117. The hydrodynamic seal of claim 1, wherein said annular seal body defining an abrupt exclusion edge of generally circular form, at least a portion of said dynamic sealing surface extending from said abrupt exclusion edge to said low pressure end surface.

118. The hydrodynamic seal of claim 1, wherein said first recess end forms an external corner with said low pressure end surface.

119. The hydrodynamic seal of claim 1, wherein at least a portion of said ramp forms a substantially straight line when said annular seal body is viewed in cross-section, and at least a portion of said ramp is parallel with said dynamic sealing surface at said second recess end.

120. The hydrodynamic seal of claim 1, wherein said recess has a boundary formed by said dynamic sealing surface and said low pressure end surface.

121. The hydrodynamic seal of claim 1, wherein said recess borders a portion of said low pressure end surface and borders a portion of said dynamic sealing surface.

122. The hydrodynamic seal of claim 1, wherein said at least a portion of said flank is recessed relative to said low pressure end surface.

123. The hydrodynamic seal of claim 1, wherein said ramp and flank being a first ramp and a first flank, said annular seal body defining a second generally circumferentially-oriented recess having a second ramp adjoining a second flank, at least a portion of said second ramp having a depth relative to said dynamic sealing surface, at least a portion of said second flank forming a second support shoulder established by a second external corner with said dynamic sealing surface, a circumferential portion of said dynamic sealing surface being located in circumferential alignment with and between said first ramp and said second support shoulder.

124. The hydrodynamic seal of claim 1, wherein said dynamic sealing surface terminates at an abrupt exclusion edge of generally circular form;
    at least a portion of said internal corner between said flank and said ramp being separated from said abrupt exclusion edge by a first separating distance, said first separating distance gradually diminishing along at least part of said recess circumferential length, said first separating distance being greatest at said first recess end; and
    at least a portion of said support shoulder being separated from said abrupt exclusion edge by a second separating distance, said second separating distance gradually diminishing along at least part of said recess circumferential length, said second separating distance being greatest at said first recess end.

125. The hydrodynamic seal of claim 1, wherein a circumferential portion of said dynamic sealing surface being located in circumferential alignment with said recess.

126. The hydrodynamic seal of claim 1, wherein said low pressure end surface has an inner surface edge and an outer surface edge, at least part of said inner surface edge being located at an intersection with said dynamic sealing surface, and at least a portion of said ramp is located in intermediate relation to at least part of said inner surface edge and said outer surface edge.

127. The hydrodynamic seal of claim 1, wherein said low pressure end surface has an inner surface edge and an outer surface edge, at least part of said inner surface edge being located at an intersection with said dynamic sealing surface, and at least a portion of said first recess end is located in intermediate relation to said outer surface edge and said at least a portion of said inner surface edge.

128. The hydrodynamic seal of claim 1, wherein an edge of said dynamic sealing surface is formed by an intersection between said dynamic sealing surface and said low pressure end surface, and at least a portion of said recess is circumferentially aligned with said edge of said dynamic sealing surface.

129. The hydrodynamic seal of claim 1, wherein said annular seal body defining an abrupt exclusion edge of generally circular form establishing a first edge of said dynamic sealing surface, and said dynamic sealing surface having a second edge and extending between said first edge and at least a portion of said second edge, said at least a portion of said second edge being circumferentially oriented and circumferentially aligned with at least a part of said recess.

130. The hydrodynamic seal of claim 1, wherein a juncture between said dynamic sealing surface and said low pressure end surface establishes a lubricant end transition in the form of an external corner, and said support shoulder terminates at said lubricant end transition.

131. The hydrodynamic seal of claim 1, wherein said annular seal body defining an abrupt exclusion edge of generally circular form establishing a first edge of said dynamic sealing surface, and said dynamic sealing surface having a second edge, and said dynamic sealing surface extending between said first edge and at least a portion of said second edge, said low pressure end surface is generally V-shaped, comprising oppositely sloped first and second low pressure end portions meeting at a circular intersection, said circular intersection being an axial extremity of said annular seal body, said second low pressure end portion being circular and located radially inward from said first low pressure end portion; and said ramp having a first side and a second side extending between said first and second recess ends, at least a portion of said first side of said ramp being located between said first edge of said dynamic sealing surface and said second side of said ramp, and at least a portion of said second side of said ramp being located in intermediate relation to said second edge of said dynamic sealing surface and said axial extremity of said seal body.

132. The hydrodynamic seal of claim 1, wherein said ramp having a first side and a second side extending between said first and second recess ends, said ramp having a ramp width between said first and second sides that increases over at least part of said recess circumferential length, said ramp width at said second recess end being larger than said ramp width at said first recess end.

133. The hydrodynamic seal of claim 1, wherein said annular seal body defining an abrupt exclusion edge of generally circular form establishing a first edge of said dynamic sealing surface, and said dynamic sealing surface having a second edge axially separated from said first edge, and said dynamic sealing surface extending between said first edge and at least a portion of said second edge, said low pressure end surface is generally V-shaped, comprising oppositely sloped first and second low pressure end portions meeting at a circular intersection, said circular intersection being an axial extremity of said annular seal body, said second low pressure end portion being circular and located radially inward from said first low pressure end portion;

said ramp having a first side and a second side extending between said first and second recess ends, at least a portion of said first side of said ramp being located between said first edge of said dynamic sealing surface and said second side of said ramp; and said second side of said ramp being misaligned with said second edge of said dynamic sealing surface at said first recess end and said second side of said ramp being aligned with said second edge of said dynamic sealing surface at said second recess end.

134. The hydrodynamic seal of claim 1, wherein said annular seal body defining an abrupt exclusion edge of generally circular form establishing a first edge of said dynamic sealing surface, and said dynamic sealing surface having a second edge, and said dynamic sealing surface extending between said first edge and at least a portion of said second edge, said ramp having a first side and a second side extending between said first and second recess ends, at least a portion of said first side of said ramp being located between said first edge of said dynamic sealing surface and said second side of said ramp, and at least a portion of said second side of said ramp terminating at said second edge of said dynamic sealing surface.

135. The hydrodynamic seal of claim 1, wherein said annular seal body defining an abrupt exclusion edge of generally circular form establishing a first edge of said dynamic sealing surface, and a juncture between said dynamic sealing surface and said low pressure end surface establishes a lubricant end transition in the form of an external corner; and said ramp having a first side and a second side extending between said first and second recess ends, at least a portion of said first side of said ramp being located between said abrupt exclusion edge and said second side of said ramp, and at least a portion of said second side of said ramp terminating at said lubricant end transition.

136. The hydrodynamic seal of claim 1, where said dynamic sealing surface has an axial surface width, and said axial surface width transitions from a minimum axial surface width to a maximum axial surface width at said second recess end.

137. The hydrodynamic seal of claim 1, where said dynamic sealing surface has an axial surface width that gradually changes along said recess circumferential length, said axial surface width decreasing from said first recess end to said second recess end, and becoming a maximum axial surface width adjacent to said second recess end.

138. The hydrodynamic seal of claim 1, wherein at least a portion of said first recess end is circumferentially in line with a portion of said low pressure end surface, and at least a portion of said second recess end is circumferentially in line with at least a portion of said dynamic sealing surface.

* * * * *